United States Patent
Leung

(10) Patent No.: US 10,778,290 B2
(45) Date of Patent: Sep. 15, 2020

(54) RADIO-FREQUENCY FRONT-END SYSTEMS

(71) Applicant: SKYWORKS SOLUTIONS, INC., Woburn, MA (US)

(72) Inventor: John Chi-Shuen Leung, Foothill Ranch, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

(21) Appl. No.: 16/269,489

(22) Filed: Feb. 6, 2019

(65) Prior Publication Data
US 2020/0014429 A1    Jan. 9, 2020

Related U.S. Application Data

(60) Provisional application No. 62/626,698, filed on Feb. 6, 2018.

(51) Int. Cl.
| | | |
|---|---|---|
| *H04B 7/0413* | (2017.01) | |
| *H04B 1/00* | (2006.01) | |
| *H04B 1/04* | (2006.01) | |

(52) U.S. Cl.
CPC ......... *H04B 7/0413* (2013.01); *H04B 1/0057* (2013.01); *H04B 1/0067* (2013.01); *H04B 1/04* (2013.01); *H04B 2001/0408* (2013.01)

(58) Field of Classification Search
CPC .... H04B 1/005; H04B 1/0053; H04B 1/0057; H04B 1/006; H04B 1/0067; H04B 1/04; H04B 7/0404; H04B 7/0413; H04B 2001/0408; H04L 5/001; H04L 27/0002
See application file for complete search history.

(56) References Cited

U.S. PATENT DOCUMENTS

| | | | | |
|---|---|---|---|---|
| 2014/0329475 | A1* | 11/2014 | Ella | H04B 1/006 455/77 |
| 2017/0201369 | A1* | 7/2017 | Ella | H03H 9/706 |
| 2017/0251474 | A1* | 8/2017 | Khlat | H04B 1/0092 |
| 2017/0373730 | A1* | 12/2017 | Pehlke | H04B 1/0064 |
| 2018/0019768 | A1* | 1/2018 | King | H04B 1/0057 |
| 2018/0331714 | A1* | 11/2018 | See | H04B 1/44 |

* cited by examiner

*Primary Examiner* — David B Lugo
(74) *Attorney, Agent, or Firm* — Chang & Hale LLP

(57) ABSTRACT

A radio frequency front end system can include a first module configured to provide multi-input multi-output (MIMO) receive operations for a first plurality of mid bands and a first plurality of high bands. The first module can be further configured to provide transmit operations for the plurality of mid bands. The first module can include a first node. The radio frequency front end system can include a second module configured to provide transmit and receive operations for a second plurality of mid bands and a second plurality of high bands. The second module can be a power amplifier integrated duplexer (PAiD) module. The second module can include a second node. The first module and the second module can be coupled by a signal path at the first node and the second node, respectively.

20 Claims, 9 Drawing Sheets

RADIO-FREQUENCY FRONT-END SYSTEMS

CROSS-REFERENCE TO RELATED APPLICATION(S)

This application claims the benefit of U.S. Provisional Patent Application No. 62/626,698, filed Feb. 6, 2018, entitled "RADIO-FREQUENCY FRONT-END SYSTEM," which is incorporated by reference herein in its entirety.

BACKGROUND

Field

Embodiments of the invention relate to electronic systems, and in particular, to radio frequency (RF) electronics.

Description of Related Art

A radio frequency (RF) device can include multiple antennas for supporting communications. Additionally, the RF device can include a radio frequency front end (RFFE) system for processing signals received from and transmitted to the antennas. The RFFE system can provide a number of functions, including, but not limited to, signal filtering, controlling component connectivity to the antennas, and/or signal amplification.

SUMMARY

In some implementations, the present disclosure relates to a radio frequency front end system. The radio frequency front end system includes a first module configured to provide multi-input multi-output (MIMO) receive operations for a first plurality of mid bands and a first plurality of high bands. The first module is further configured to provide transmit operations for the plurality of mid bands. The first module includes a first node. The radio frequency front end system includes a second module configured to provide transmit and receive operations for a second plurality of mid bands and a second plurality of high bands. The second module is a power amplifier integrated duplexer (PAiD) module. The second module includes a second node. The first module and the second module are coupled by a signal path at the first node and the second node, respectively.

In some embodiments, the second module is coupled to a plurality of antennas.

In some embodiments, the second module includes an antenna switch coupled to the plurality of antennas, and the antenna switch is configured to route signals between the plurality of antennas and the first module through the first node, the signal path, and the second node.

In some embodiments, the first module includes a mid-band power amplifier configured to amplify signals associated with the first plurality of mid bands.

In some embodiments, the second module includes a high-band power amplifier configured to amplify signals associated with the second plurality of high bands and a mid-band power amplifier configured to amplify signals associated with the second plurality of mid bands.

In some embodiments, the first modules includes a plurality of transmit filters, a plurality of receive filters, and a plurality of phase shifters.

In some embodiments, the second module includes a plurality of transmit filters, a plurality of receive filters, and a plurality of phase shifters.

In some embodiments, the first module and the second module are configured to provide MIMO receive operations for at least some of the first plurality of mid bands and the second plurality of mid bands, and at least some of the first plurality of high bands and the second plurality of high bands.

In some embodiments, the first module is configured to provide carrier aggregation operations for two or more of the first plurality of mid bands and the first plurality of high bands, and the second module is configured to provide carrier aggregation operations for two or more of the second plurality of mid bands and the second plurality of high bands.

In some embodiments, the first module and the second module provide transmit operations for one or more different bands from each other.

In some embodiments, the first plurality of mid bands and the second plurality of mid bands have a frequency between 1 GHz and 2.3 GHz, and the first plurality of high bands and the second plurality of high bands have a frequency greater than 2.3 GHz.

According to certain implementations, the present disclosure relates to a wireless device that includes a plurality of antennas, a transceiver, and a radio frequency front end system coupled between the transceiver and the plurality of primary antennas. The radio frequency front end system includes a first module configured to provide multi-input multi-output (MIMO) receive operations for a first plurality of mid bands and a first plurality of high bands. The first module is further configured to provide transmit operations for the plurality of mid bands. The first module includes a first node. The radio frequency front end system includes a second module configured to provide transmit and receive operations for a second plurality of mid bands and a second plurality of high bands. The second module is a power amplifier integrated duplexer (PAiD) module. The second module includes a second node. The first module and the second module are coupled by a signal path at the first node and the second node, respectively.

In some embodiments, the second module is coupled to the plurality of antennas.

In some embodiments, the second module includes an antenna switch coupled to the plurality of antennas, and the antenna switch is configured to route signals between the plurality of antennas and the first module through the first node, the signal path, and the second node.

In some embodiments, the first module includes a mid-band power amplifier configured to amplify signals associated with the first plurality of mid bands.

In some embodiments, the second module includes a high-band power amplifier configured to amplify signals associated with the second plurality of high bands and a mid-band power amplifier configured to amplify signals associated with the second plurality of mid bands.

In some embodiments, the first module and the second module are configured to provide MIMO receive operations for at least some of the first plurality of mid bands and the second plurality of mid bands, and at least some of the first plurality of high bands and the second plurality of high bands.

In some embodiments, the first module is configured to provide carrier aggregation operations for two or more of the first plurality of mid bands and the first plurality of high bands, and the second module is configured to provide carrier aggregation operations for two or more of the second plurality of mid bands and the second plurality of high bands.

In some embodiments, the first module and the second module provide transmit operations for one or more different bands from each other.

In some embodiments, the first plurality of mid bands and the second plurality of mid bands have a frequency between 1 GHz and 2.3 GHz, and the first plurality of high bands and the second plurality of high bands have a frequency greater than 2.3 GHz.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF SOME EMBODIMENTS

Figure 1:
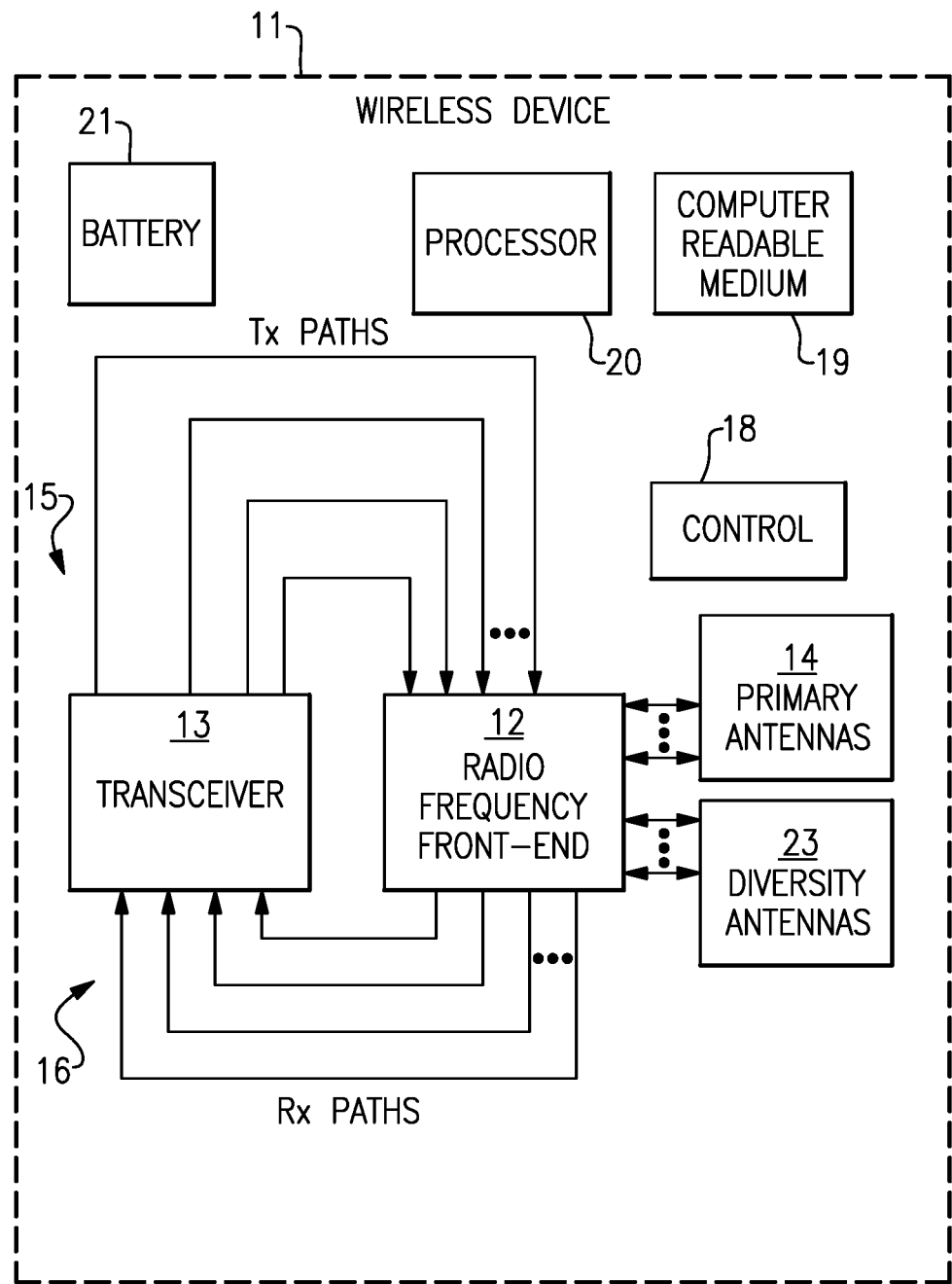
FIG. 1 is a schematic block diagram of a wireless device, according to some embodiments of the present disclosure.

The headings provided herein, if any, are for convenience only and do not necessarily affect the scope or meaning of the claimed invention.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

A radio frequency (RF) device can include multiple antennas for supporting communications. Additionally, the RF device can include a radio frequency front end (RFFE) system for processing signals received from and transmitted to the antennas. The RFFE system can provide a number of functions, including, but not limited to, signal filtering, controlling component connectivity to the antennas, and/or signal amplification.

RFFE systems can be used to handle RF signals of a wide variety of types, including, but not limited to, wireless local area network (WLAN) signals, Bluetooth signals, and/or cellular signals. Additionally, RFFE systems can be used to process signals of a wide range of frequencies. For example, certain RFFE systems can operate using one or more low bands (LBs) (for example, RF signal bands having a frequency of 1 GHz or less), one or more mid bands (MBs) (for example, RF signal bands having a frequency between 1 GHz and 2.3 GHz), and one or more high bands (HBs) (for example, RF signal bands having a frequency greater than 2.3 GHz). RFFE systems can be used in a wide variety of RF devices, including, but not limited to, smartphones, base stations, laptops, handsets, wearable electronics, and/or tablets.

An RFFE system can be implemented to support a variety of features that enhance bandwidth and/or other performance characteristics of an RF device.

In one example, an RFFE system is implemented to support carrier aggregation (CA), thereby providing flexibility to increase peak data rates. Carrier aggregation can be used for both Frequency Division Duplexing (FDD) and Time Division Duplexing (TDD), and may be used to aggregate a plurality of carriers or channels, for instance up to five carriers. Carrier aggregation includes contiguous aggregation, in which contiguous carriers within the same operating frequency band are aggregated. Carrier aggregation can also be non-contiguous, and can include carriers separated in frequency within a common band or in different bands.

In another example, an RFFE system is implemented to support multi-input and multi-output (MIMO) communications to increase throughput and enhance mobile broadband service. MIMO communications use multiple antennas for communicating multiple data streams over a single radio frequency channel. MIMO communications benefit from higher signal to noise ratio, improved coding, and/or reduced signal interference due to spatial multiplexing differences of the radio environment.

MIMO order refers to a number of separate data streams sent or received. For instance, a MIMO order for downlink communications can be described by a number of transmit antennas of a base station and a number of receive antennas for user equipment (UE), such as a mobile device. For example, two-by-two (2×2) RX MIMO (also referred to herein as second order receive MIMO) refers to MIMO downlink communications using two base station antennas and two UE antennas. Additionally, four-by-four (4×4) RX MIMO (also referred to herein as fourth order receive MIMO) refers to MIMO downlink communications using four base station antennas and four UE antennas.

RFFE systems that support carrier aggregation and multi-order MIMO can be used in RF devices that operate with wide bandwidth. For example, such RFFE systems can be used in applications servicing multimedia content streaming at high data rates.

Among others, U.S. patent application Ser. No. 15/936,429, filed Mar. 26, 2018, entitled "APPARATUS AND METHODS FOR RADIO FREQUENCY FRONT END SYSTEMS," and U.S. patent application Ser. No. 15/936,430, filed Mar. 26, 2018, entitled "APPARATUS AND METHODS FOR RADIO FREQUENCY FRONT END SYSTEMS," each of which is incorporated by reference herein in its entirety, describe front-end architectures capable of providing mid, high band (MHB) downlink carrier aggregation and 4×4 MIMO support. In some embodiments, a front-end architecture can be configured to support MB-MB and MB-HB uplink carrier aggregation. Such uplink carrier aggregation support can be implemented with some or all of the foregoing MHB downlink carrier aggregation and 4×4 MIMO support described in the above-referenced applications, independently, or any combination thereof.

Apparatus and methods for RFFE systems are provided herein. In certain implementations, an RFFE system includes a first module configured to provide multi-input multi-output (MIMO) receive operations for a first plurality of mid bands and a first plurality of high bands. The first module can be further configured to provide transmit operations for the plurality of mid bands. The first module can include a first node. The RFFE system can also include a second module configured to provide transmit and receive operations for a second plurality of mid bands and a second plurality of high bands. The second module can be a power amplifier integrated duplexer (PAiD) module. The second module can include a second node. The first module and the second module can be coupled by a signal path at the first node and the second node, respectively. Implementing the RFFE system in this manner can support MIMO operations and/or CA operations for one or more MBs and one or more HBs. The RFFE system can also support various transmit and receive operations for one or more MBs and one or more HBs using the first module and the second module.

The RFFE systems herein can also exhibit excellent performance when carrier aggregation and/or MIMO functionality is disabled. For instance, receive filters associated with downlink carrier aggregation and/or MIMO can be switch combined such that they are not present in a signal path when operating using a single frequency carrier. Accordingly, certain embodiments herein not only can be used to provide an RF device with high performance carrier aggregation and RX MIMO, but also robust single carrier performance when the RF device operates with carrier aggregation and MIMO features disabled.

FIG. 1 is a schematic block diagram of one example of a wireless or mobile device 11. The mobile device 11 can include an RFFE system implementing one or more features of the present disclosure.

The example mobile device 11 depicted in FIG. 1 can represent a multi band and/or multi-mode device such as a multi-band/multi-mode mobile phone. By way of examples, Global System for Mobile (GSM) communication standard is a mode of digital cellular communication that is utilized in many parts of the world. GSM mode mobile phones can operate at one or more of four frequency bands: 850 MHz (approximately 824 849 MHz for Tx, 869-894 MHz for Rx), 900 MHz (approximately 880-915 MHz for Tx, 925-960 MHz for Rx), 1800 MHz (approximately 1710-1785 MHz for Tx, 1805-1880 MHz for Rx), and 1900 MHz (approximately 1850-1910 MHz for Tx, 1930-1990 MHz for Rx). Variations and/or regional/national implementations of the GSM bands are also utilized in different parts of the world.

Code division multiple access (CDMA) is another standard that can be implemented in mobile phone devices. In certain implementations, CDMA devices can operate in one or more of 800 MHz, 900 MHz, 1800 MHz and 1900 MHz bands, while certain W-CDMA and Long Term Evolution (LTE) devices can operate over, for example, 22 or more radio frequency spectrum bands.

Transmit and receive modules of the present disclosure can be used within a mobile device implementing the foregoing example modes and/or bands, and in other communication standards. For example, 3G, 4G, LTE, and Advanced LTE are non-limiting examples of such standards.

In the illustrated embodiment, the mobile device 11 includes an RFFE system 12, a transceiver 13, primary antennas 14, a control component 18, a computer readable medium 19, a processor 20, a battery 21, and diversity antennas 23.

The transceiver 13 can generate RF signals for transmission via the primary antennas 14 and/or the diversity antennas 23. Furthermore, the transceiver 13 can receive incoming RF signals from the primary antennas 14 and/or the diversity antennas 23. It will be understood that various functionalities associated with transmitting and receiving of RF signals can be achieved by one or more components that are collectively represented in FIG. 1 as the transceiver 13. For example, a single component can be configured to provide both transmitting and receiving functionalities. In another example, transmitting and receiving functionalities can be provided by separate components.

In FIG. 1, one or more output signals from the transceiver 13 are depicted as being provided to the RFFE system 12 via one or more transmission paths 15. In the example shown, different transmission paths 15 can represent output paths associated with different bands and/or different power outputs. For instance, the two different paths shown can represent paths associated with different power outputs (e.g., low power output and high power output), and/or paths associated with different bands. Although FIG. 1 illustrates a configuration using multiple transmission paths 15, the mobile device 11 can be adapted to include more or fewer transmission paths 15.

In FIG. 1, one or more receive signals are depicted as being provided from the RFFE system 12 to the transceiver 13 via one or more receiving paths 16. In the example shown, different receiving paths 16 can represent paths associated with different bands. For example, the four example paths 16 shown can represent quad band capability that some mobile devices are provided with. Although FIG. 1 illustrates a configuration using four receiving paths 16, the mobile device 11 can be adapted to include more or fewer receiving paths 16.

As shown in FIG. 1, the RFFE system 12 controls communications between the transceiver 13 and the device's primary antennas 14 and diversity antennas 23. The RFFE system 12 can provide a number of functionalities associated with, for example, MIMO communications, switching between different bands, carrier aggregation, switching between different power modes, filtering of signals, duplexing of signals, and/or some combination thereof.

The illustrated control component 18 can be provided for controlling various control functionalities associated with operations of the RFFE system 12 and/or other operating component(s). For example, the control component 18 can provide control signals to the RRFE 12 to control electrical connectivity to the primary antennas 14 and/or diversity antennas 23, for instance, by setting states of switches.

In certain embodiments, the processor 20 can be configured to facilitate implementation of various processes on the mobile device 11. The processor 20 can be a general purpose computer, special purpose computer, or other programmable data processing apparatus. In certain implementations, the mobile device 11 can include a computer readable memory 19, which can include computer program instructions that may be provided to and executed by the processor 20.

The battery 21 can be any suitable battery for use in the mobile device 11, including, for example, a lithium-ion battery.

The illustrated mobile device 11 includes the diversity antennas 23, which can help improve the quality and reliability of a wireless link relative to a configuration in which a mobile device only includes primary antennas. For example, including the diversity antennas 23 can reduce line of sight losses and/or mitigate the impacts of phase shifts, time delays, and/or distortions associated with signal interference of the primary antennas 14. Thus, the transceiver 13 processes the signals received by the primary antennas 14 and diversity antennas 23 to obtain a receive signal of higher energy and/or improved fidelity relative to a configuration using only primary antennas.

The RFFE system 12 of FIG. 1 can be implemented in accordance with one or more features of the present disclosure. Although the wireless device 11 illustrates one example of an RF device that can include an RFFE system implemented in accordance with the present disclosure, the teachings herein are applicable to a wide variety of RF devices. Accordingly, RFFE systems can be used in other implementations of RF devices.

Figure 2:
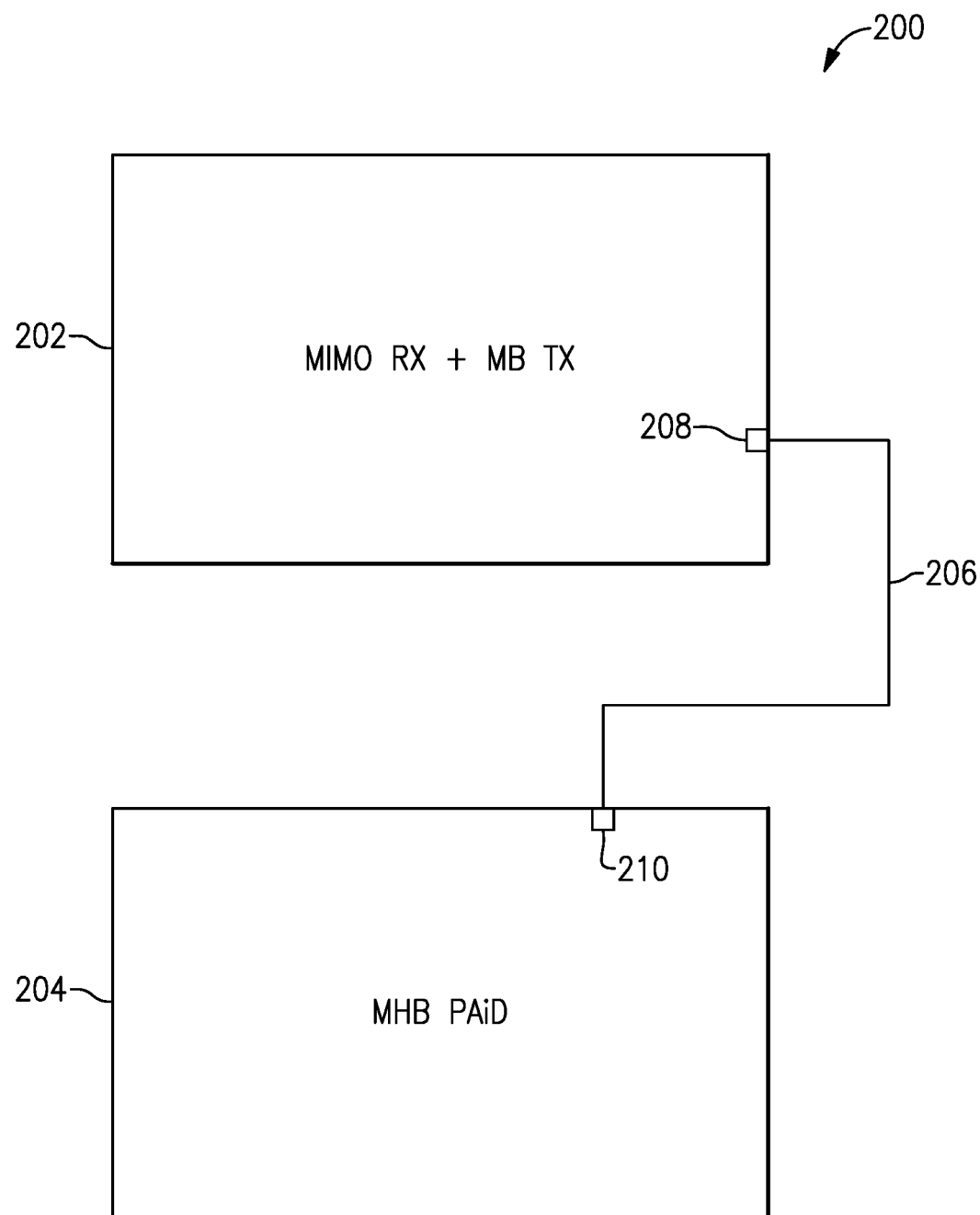
FIG. 2 is a schematic block diagram of a front-end architecture including a first module and a second module, according to some embodiments of the present disclosure.

FIG. 2 depicts an example front-end architecture 200 having a MIMO receive (RX) and MB transmit (TX) module 202 and a MHB power amplifier integrated duplexer (PAiD) module 204. The MIMO RX+MB TX module 202 can be configured to provide MIMO RX and MB TX support functionality. The MHB PAiD module 204 can be configured to provide PAiD support functionality for MB and HB band frequency ranges. The MIMO RX+MB TX module 202 and the MHB PAiD module 204 can be coupled through a signal path 206. On the module 202 side, the signal path 206 is shown to couple to the MIMO RX+MB TX module 202 at a node 208, and on the module 204 side, the signal path 206 is shown to couple to the MHB PAiD module 204 at a node 210.

Figure 3A:
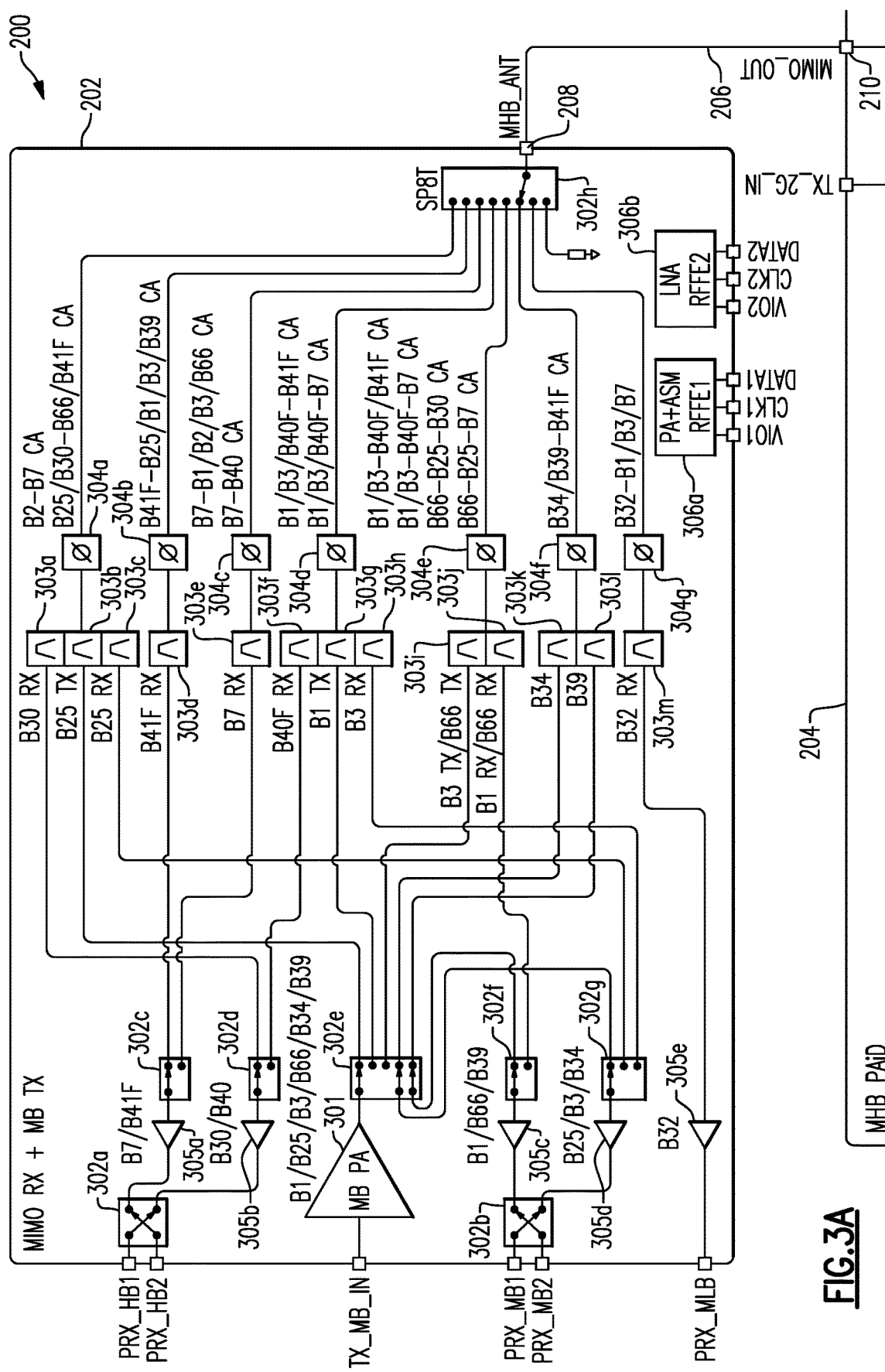
FIG. 3A is a schematic block diagram of the first module of FIG. 2, according to some embodiments of the present disclosure.
Figure 3B:
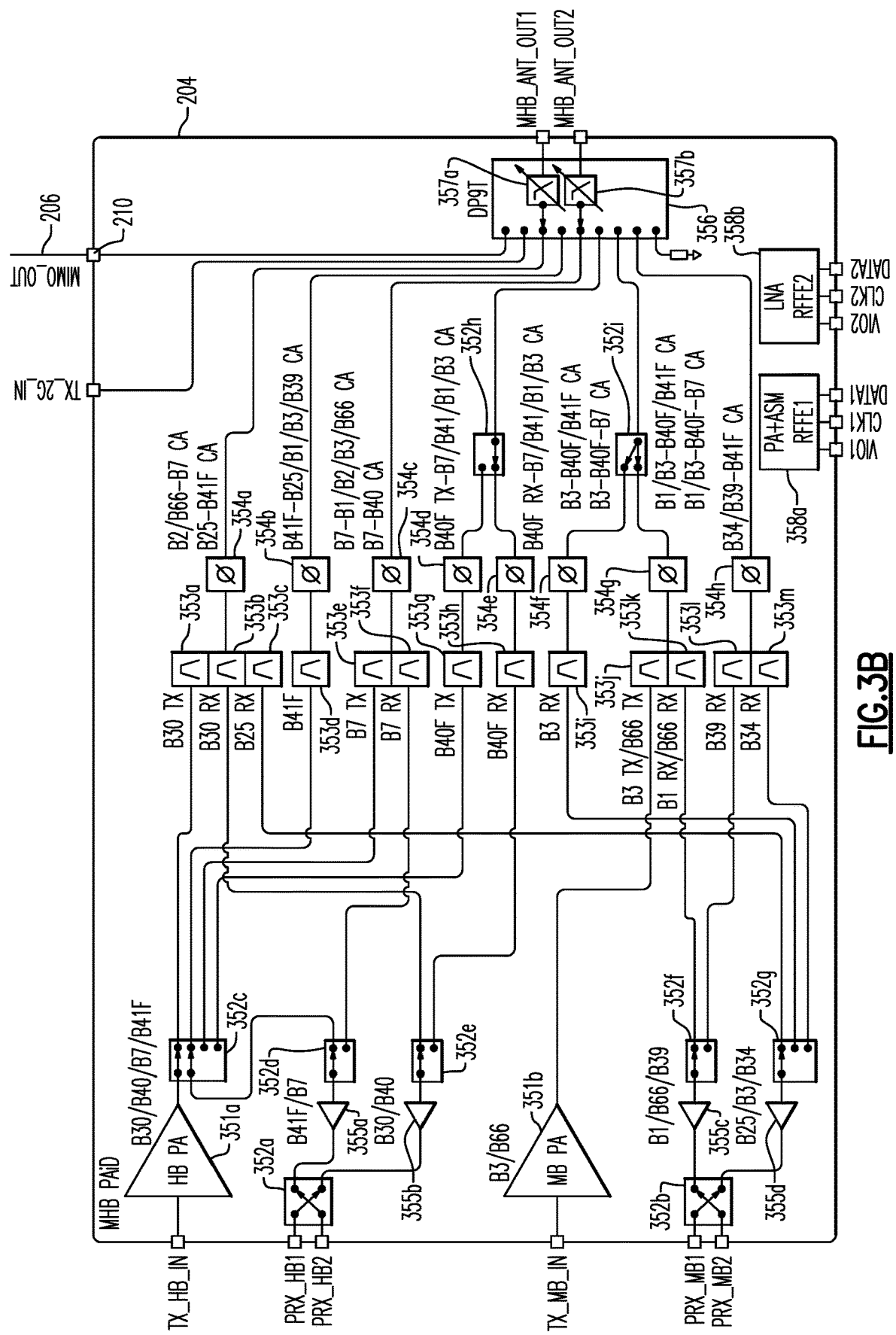
FIG. 3B is a schematic block diagram of the second module of FIG. 2, according to some embodiments of the present disclosure.

FIG. 3A shows an example of the MIMO RX+MB TX module 202 of FIG. 2, and FIG. 3B shows an example of the MHB PAiD module 204 of FIG. 2. It will be understood that in FIGS. 3A and 3B, the signal path 206 couples the MIMO RX+MB TX module 202 and the MHB PAiD module 204 through the respective nodes 208, 210.

Referring to FIGS. 3A and 3B, the MIMO RX+MB TX module 202 and the MHB PAiD module 204 can be configured to support various RX and TX operations, including MIMO operations, CA operations, and non-CA operations. Although specific implementations of HB and MB processing circuitry are shown, the teachings herein are applicable to HB and MB processing circuitry implemented in a wide variety of ways. Accordingly, other implementations are possible. Although one example of the MIMO RX+MB TX module 202 and the MHB PAiD module 204 is shown, other implementations are possible, including, for example, implementations in which the modules generate more or fewer transmit and/or receive signals and/or signals of other bands. For example, more or fewer HB and/or MB signal paths can be included to provide support for a desired number of frequency bands. In addition, the MIMO RX+MB TX module 202 and the MHB PAiD module 204 may include a different number of components (e.g., power amplifiers, switches, filters, low-noise amplifiers, etc.) from what is shown, and the components may be configured in different ways from what is shown. Cellular bands indicated in the disclosure are provided as examples, and any appropriate frequency bands may be used.

The MIMO RX+MB TX module 202 can support MIMO RX operations and MB TX operations for one or more frequency bands. In the example of FIG. 3A, the MIMO RX+MB TX module 202 can include a MB power amplifier (PA) 301, a plurality of switches 302, a plurality of filters 303, a plurality of phase shifters 304, and a plurality of low-noise amplifiers (LNAs) 305. The MIMO RX+MB TX module 202 can support various RX operations involving HB and MB signals. The MIMO RX+MB TX module 202 can process RF signals received from a plurality of antennas coupled to nodes MHB_ANT_OUT1 and MHB_ANT_OUT2 of the MHB PAiD module 204 and routed through the signal path 206. As described above, the signal path 206 can be coupled to the node MHB_ANT 208 of the MIMO RX+MB TX module 202 and the node MIMO_OUT 210 of the MHB PAiD module 204. The node MHB_ANT_OUT1 can be coupled to a first primary antenna (not shown), and the node MHB_ANT_OUT2 can be coupled to a second primary antenna (not shown). For example, the first and second primary antennas can receive MB and HB signals. In some embodiments, one or more diversity antennas can also be used. The nodes MHB_ANT_OUT1 and MHB_ANT_OUT2 can be coupled to an antenna switch 356 of the MHB PAiD module 204. The antenna switch 356 can be a multi-pole multi-throw (MPMT) switch. In the example of FIG. 3B, the antenna switch 356 is a double-pole nine-throw (DP9T) switch. A first pole of the antenna switch 356 can be coupled to the node MHB_ANT_OUT1, and a second pole of the antenna switch 356 can be coupled to the node MHB_ANT_OUT2. The antenna switch 356 can include a tunable filter 357a between the first pole and the node MHB_ANT_OUT1 and a tunable filter 357b between the second pole and the node MHB_ANT_OUT2. One throw of the antenna switch 356 can be coupled to the node MIMO_OUT 210. Another throw of the antenna switch 356 can be coupled to ground (e.g., ground termination). Remaining throws of the antenna switch 356 can be coupled to various signal paths for processing various frequency band signals, which are described below in more detail.

Signals received through the node MHB_ANT_OUT1 or the node MHB_ANT_OUT2 can be routed to the MIMO RX+MB TX module 202 through the antenna switch 356, the node MIMO_OUT 210, the signal path 206, and the node MHB_ANT 208. The node MHB_ANT 208 can be coupled to a switch 302h. The switch 302h can be a single-pole multi-throw (SPMT) switch. In the example of FIG. 3A, the switch 302h is a single-pole eight-throw (SP8T) switch. The pole of the switch 302h can be coupled to the node MHB_ANT 208. One throw of the switch 302h can be coupled to ground (e.g., ground termination). Remaining throws of the switch 302h can be coupled to a plurality of phase shifters 304a-g. A respective signal path associated with each phase shifter 304 and one or more filters 303 coupled to each phase shifter 304 can be used to support CA operations. Such CA operations can include downlink (DL) CA operations.

In the example of FIG. 3A, a first throw of the switch 302h can be coupled to a phase shifter 304a. The phase shifter 304a can be coupled to a HB RX filter 303a, a MB TX filter 303b, and a MB RX filter 303c. For example, the filters 303a, 303b, 303c can be associated with cellular bands B30, B25, and B25, respectively. The filters 303a, 303b, 303c can be band-pass filters and allow signals associated with respective frequency bands to pass through. In some embodiments, the filters 303a, 303b, 303c can be configured as a triplexer, a diplexer, a duplexer, separate filters, or a combination thereof. The phase shifter 304a and the associated filters 303a, 303b, 303c can be used to support CA operations. For example, the phase shifter 304a can support CA of cellular bands B2 and B7. As another example, the phase shifter 304a can support CA involving one of cellular bands B25 and B30 with one of cellular bands B66 and B41F. The phase shifter 304a can support CA of B25 and B66, CA of B25 and B41F, CA of B30 and B66, and CA of B30 and B41F.

The HB RX filter 303a can be coupled to a switch 302d and route associated frequency band signals (e.g., B30) from the phase shifter 304a to the switch 302d through a corresponding signal path. For example, the switch 302d can be a SPMT switch. In the example of FIG. 3A, the switch 302d is a single-pole double-throw (SPDT) switch. The HB RX filter 303a can be coupled to a first throw of the switch 302d. The pole of the switch 302d can be coupled to a LNA 305b. The LNA 305b can support signals associated with one or more HBs. For example, the LNA 305b can support signals associated with cellular bands B30 and B40. The LNA 305b can be coupled to a switch 302a. The switch 302a can be a MPMT switch. In the example of FIG. 3A, the switch 302a can be a double-pole double-throw (DPDT) switch. The LNA 305b can be coupled to a second throw of the switch 302a. A first pole of the switch 302a can be coupled to a node PRX_HB1, and a second pole of the switch 302a can be coupled to a node PRX_HB2. The nodes PRX_HB1 and PRX_HB2 can support HB signals received from one or more primary antennas. HB signals can be routed from the HB RX filter 303a through the switch 302d, the LNA 305b, and the switch 302a to either the node PRX_HB1 or the node PRX_HB2 through a corresponding signal path.

The MB RX filter 303c can be coupled to a switch 302g and route associated frequency band signals (e.g., B25) through a corresponding signal path. For example, the switch 302g can be a SPMT switch. In the example of FIG. 3A, the switch 302g is a single-pole triple-throw (SP3T) switch. The MB RX filter 303c can be coupled to a second throw of the switch 302g. The pole of the switch 302g can be coupled to a LNA 305d. The LNA 305d can support signals associated with one or more frequency MB bands. For example, the LNA 305d can support signals associated with cellular bands B25, B3, and B34. The LNA 305d can be coupled to a switch 302b. The switch 302b can be a MPMT switch. In the example of FIG. 3A, the switch 302b is a DPDT switch. The LNA 305d can be coupled to a second throw of the switch 302b. A first pole of the switch 302b can be coupled to a node PRX_MB1, and a second pole of the switch 302b can be coupled to a node PRX_MB2. The nodes PRX_MB1 and PRX_MB2 can support MB signals received from one or more primary antennas. MB signals can be routed from the MB RX filter 303c through the switch 302g, the LNA 305d, and the switch 302b to either the node PRX_MB1 or the node PRX_MB2 through a corresponding signal path.

A second throw of the switch 302h can be coupled to a phase shifter 304b. The phase shifter 304b can be coupled to a HB RX filter 303d. For example, the HB RX filter 303d can be associated with cellular band B41F. The filter 303d can be a band-pass filter and allow signals associated with a respective frequency band to pass through. The phase shifter 304b and the associated filter 303d can be used to support CA operations. For example, the phase shifter 304b can support CA of cellular band B41F with one of cellular bands B25, B1, B3, and B39. The phase shifter 304b can support CA of B41F and B25, CA of B41F and B1, CA of B41F and B3, and CA of B41F and B39. The HB RX filter 303d can be coupled to a switch 302c and route associated frequency band signals (e.g., B41F) from the phase shifter 304b to the switch 302c through a corresponding signal path. For example, the switch 302c can be a SPMT switch. In the example of FIG. 3A, the switch 302c is a SPDT switch. The HB RX filter 303d can be coupled to a first throw of the switch 302c. The pole of the switch 302c can be coupled to a LNA 305a. The LNA 305a can support signals associated with one or more HBs. For example, the LNA 305a can support signals associated with cellular bands B7 and B41F. The LNA 305a can be coupled to the switch 302a. For example, the LNA 305a can be coupled to a first throw of the switch 302a. HB signals can be routed from the HB RX filter 303d through the switch 302c, the LNA 305a, and the switch 302a to either the node PRX_HB1 or the node PRX_HB2 through a corresponding signal path.

A third throw of the switch 302h can be coupled to a phase shifter 304c. The phase shifter 304c can be coupled to a HB RX filter 303e. For example, the HB RX filter 303e can be associated with cellular band B7. The filter 303e can be a band-pass filter and allow signals associated with a respective frequency band to pass through. The phase shifter 304c and the associated filter 303e can be used to support CA operations. For example, the phase shifter 304c can support CA of cellular band B7 with one of cellular bands B1, B2, B3, and B66. The phase shifter 304c can support CA of B7 and B1, CA of B7 and B2, CA of B7 and B3, and CA of B7 and B66. As another example, the phase shifter 304c can also support CA of cellular bands B7 and B40. The HB RX filter 303e can be coupled to the switch 302c and route associated frequency band signals (e.g., B7) from the phase shifter 304c to the switch 302c through a corresponding signal path. The HB RX filter 303e can be coupled to a second throw of the switch 302c. The switch 302c can be coupled to the LNA 305a, and the LNA 305a can be coupled to the switch 302a. HB signals can be routed from the HB RX filter 303e through the switch 302c, the LNA 305a, and the switch 302a to either the node PRX_HB1 or the node PRX_HB2 through a corresponding signal path.

A fourth throw of the switch 302h can be coupled to a phase shifter 304d. The phase shifter 304d can be coupled to a HB RX filter 303f, a MB TX filter 303g, and a MB RX filter 303h. For example, the filters 303f, 303g, 303h can be associated with cellular bands B40F, B1, and B3, respectively. The filters 303f, 303g, 303h can be band-pass filters and allow signals associated with respective frequency bands to pass through. In some embodiments, the filters 303f, 303g, 303h can be configured as a triplexer, a diplexer, separate filters, or a combination thereof. The phase shifter 304d and the associated filters 303f, 303g, 303h can be used to support CA operations. For example, the phase shifter 304d can support CA involving one of cellular bands B1, B3, and B40F with cellular band B41F. The phase shifter 304d can support CA of B1 and B41F, CA of B3 and B41F, and CA of B40F and B41F. As another example, the phase shifter 304d can support CA involving one of cellular bands B1, B3, and B40F with cellular band B7. The phase shifter 304d can support CA of B1 and B7, CA of B3 and B7, and CA of B40F and B7. The HB RX filter 303f can be coupled to the switch 302*d* and route associated frequency band signals (e.g., B40F) from the phase shifter 304*d* to the switch 302*d* through a corresponding signal path. The HB RX filter 303*f* can be coupled to a second throw of the switch 302*d*. The switch 302*d* can be coupled to the LNA 305*b*, and the LNA 305*b* can be coupled to the switch 302*a*. HB signals can be routed from the HB RX filter 303*f* through the switch 302*d*, the LNA 305*b*, and the switch 302*a* to either the node PRX_HB1 or the node PRX_HB2 through a corresponding signal path. The MB RX filter 303*h* can be coupled to the switch 302*g* and route associated frequency band signals (e.g., B3) through a corresponding signal path. For example, the MB RX filter 303*h* can be coupled to a third throw of the switch 302*g*. The switch 302*g* can be coupled to the LNA 305*d*, and the LNA 305*d* can be coupled to the switch 302*b*. MB signals can be routed from the MB RX filter 303*h* through the switch 302*g*, the LNA 305*d*, and the switch 302*b* to either the node PRX_MB1 or the node PRX_MB2 through a corresponding signal path.

A fifth throw of the switch 302*h* can be coupled to a phase shifter 304*e*. The phase shifter 304*e* can be coupled to a MB TX filter 303*i* and a MB RX filter 303*j*. For example, the filter 303*i* can be associated with one or more of cellular bands B3 and B66, and the filter 303*j* can be associated with one or more of cellular bands B1 and B66. The filters 303*i*, 303*j* can be band-pass filters and allow signals associated with respective frequency bands to pass through. In some embodiments, the filters 303*i*, 303*j* can be configured as a diplexer, as a duplexer, or as separate filters. The phase shifter 304*e* and the associated filters 303*i*, 303*j* can be used to support CA operations. For example, the phase shifter 304*e* can support CA involving one of cellular bands B1 and B3 with one of cellular bands B40F and B41F. The phase shifter 304*e* can support CA of B1 and B40F, CA of B1 and B41F, CA of B3 and B40F, and CA of B3 and B41F. As another example, the phase shifter 304*e* can support CA involving one of cellular bands B1 and B3 with cellular bands B40F and B7. The phase shifter 304*e* can support CA of B1, B40, and B7, and CA of B3, B40F, and B7. As a third example, the phase shifter 304*e* can support CA of cellular bands B66, B25, and B30. As a fourth example, the phase shifter 304*e* can support CA of cellular bands B66, B25, and B7. The MB RX filter 303*j* can be coupled to a switch 302*f* and route associated frequency band signals (e.g., B1, B66, etc.) through a corresponding signal path. For example, the switch 302*f* can be a SPMT switch. In the example of FIG. 3A, the switch 302*f* is a SPDT switch. The MB RX filter 303*j* can be coupled to a second throw of the switch 302*f*. The pole of the switch 302*f* can be coupled to a LNA 305*c*. The LNA 305*c* can support signals associated with one or more MBs. For example, the LNA 305*c* can support signals associated with cellular bands B1, B66, and B39. The LNA 305*c* can be coupled to the switch 302*b*. For example, the LNA 305*c* can be coupled to a first throw of the switch 302*b*. MB signals can be routed from the MB RX filter 303*j* through the switch 302*f*, the LNA 305*c*, and the switch 302*b* to either the node PRX_MB1 or the node PRX_MB2 through a corresponding signal path.

A sixth throw of the switch 302*h* can be coupled to a phase shifter 304*f*. The phase shifter 304*f* can be coupled to a MB TX/RX filter 303*k* and a MB TX/RX filter 303*l*. For example, the filters 303*k* and 303*l* can be associated with cellular bands B34 and B39, respectively. The filters 303*k*, 303*l* can be band-pass filters and allow signals associated with respective frequency bands to pass through. In some embodiments, the filters 303*k*, 303*l* can be configured as a diplexer, a duplexer, separate filters, or a combination thereof. The phase shifter 304*f* and the associated filters 303*k*, 303*l* can be used to support CA operations. For example, the phase shifter 304*f* can support CA involving one of cellular bands B34 and B39 with cellular band B41F. The phase shifter 304*f* can support CA of B34 and B41F, and CA of B39 and B41F. The MB TX/RX filter 303*k* can be coupled to a switch 302*e* and route associated frequency band signals (e.g., B34) through a corresponding signal path. For example, the switch 302*e* can be a MPMT switch. In the example of FIG. 3A, the switch 302*e* is a three-pole five-throw (3P5T) switch. The MB TX/RX filter 303*k* can be coupled to a fourth throw of the switch 302*e*. A first pole of the switch 302*e* can be coupled to the MB PA 301. A second pole of the switch 302*e* can be coupled to a first throw of the switch 302*g*. A third pole of the switch 302*e* can be coupled to a first throw of the switch 302*f*. Additional details relating to the switch 302*e* are described below. The switch 302*g* can be coupled to the LNA 305*d*, and the LNA 305*d* can be coupled to the switch 302*b*. MB signals can be routed from the MB TX/RX filter 303*k* through the switch 302*e*, the switch 302*g*, the LNA 305*d*, and the switch 302*b* to either the node PRX_MB1 or the node PRX_MB2 through a corresponding signal path. The MB TX/RX filter 303*l* can be coupled to the switch 302*e* and route associated frequency band signals (e.g., B39) through a corresponding signal path. The MB TX/RX filter 303*l* can be coupled to a fifth throw of the switch 302*e*. The third pole of the switch 302*e* can be coupled to the first throw of the switch 302*f*. The switch 302*f* can be coupled to the LNA 305*c*, and the LNA 305*c* can be coupled to the switch 302*b*. MB signals can be routed from the MB TX/RX filter 303*l* through the switch 302*e*, the switch 302*f*, the LNA 305*c*, and the switch 302*b* to either the node PRX_MB1 or the node PRX_MB2 through a corresponding signal path.

A seventh throw of the switch 302*h* can be coupled to a phase shifter 304*g*. The phase shifter 304*g* can be coupled to a MB RX filter 303*m*. For example, the MB RX filter 303*m* can be associated with cellular band B32. The filter 303*m* can be a band-pass filter and allow signals associated with a respective frequency band to pass through. The phase shifter 304*g* and the associated filter 303*m* can be used to support CA operations. For example, the phase shifter 304*g* can support CA of cellular band B32 with one of cellular bands B1, B3, and B7. The phase shifter 304*g* can support CA of cellular bands B32 and B1, CA of B32 and B3, and CA of B32 and B7. The MB RX filter 303*m* can be coupled to a LNA 305*e*. The LNA 305*e* can support signals associated with one or more MBs. For example, the LNA 305*e* can support signals associated with cellular band B32. The LNA 305*e* can be coupled to a node PRX_MLB. MB signals can be routed from the MB RX filter 303*m* through the LNA 305*e* to the node PRX_MLB through a corresponding signal path.

The MIMO RX+MB TX module 202 can also support various TX operations involving MB signals. The MIMO RX+MB TX module 202 can amplify RF signals received through a node TX_MB_IN and route the amplified RF signals through the node MHB_ANT 208, the signal path 206, and the node MIMO_OUT 210 to either the node MHB_ANT_OUT1 or the node MHB_ANT_OUT2 of the MHB PAiD module 204. The MIMO RX+MB TX module 202 can include the MB PA 301 for amplifying RF signals for transmission. In some embodiments, the MB PA 301 can be an envelope tracking (ET) PA. The MB PA 301 can be coupled to the node TX_MB_IN. For example, RF signals to be amplified can be input to the node TX_MB_IN. The MB PA 301 can be coupled to the switch 302*e*. For example, the first pole of the switch 302*e* can be coupled to the MB PA 301. A first throw of the switch 302*e* can be coupled to the MB TX filter 303*b*. For example, the MB TX filter 303*b* can be associated with cellular band B25. The MB TX filter 303*b* can be coupled to the phase shifter 304*a*. MB signals amplified by the MB PA 301 that are within a frequency band associated with the MB TX filter 303*b* can pass through the MB TX filter 303*b* and can be routed through the phase shifter 304*a*, the switch 302*h*, the node MHB_ANT 208, the signal path 206, the node MIMO_OUT 210, and the antenna switch 356 to either the node MHB_ANT_OUT1 or the node MHB_ANT_OUT2 through a corresponding signal path.

A second throw of the switch 302*e* can be coupled to the MB TX filter 303*g*. For example, the MB TX filter 303*g* can be associated with cellular band B1. The MB TX filter 303*g* can be coupled to the phase shifter 304*d*. MB signals amplified by the MB PA 301 that are within a frequency band associated with the MB TX filter 303*g* can pass through the MB TX filter 303*g* and can be routed through the phase shifter 304*d*, the switch 302*h*, the node MHB_ANT 208, the signal path 206, the node MIMO_OUT 210, and the antenna switch 356 to either the node MHB_ANT_OUT1 or the node MHB_ANT_OUT2 through a corresponding signal path.

A third throw of the switch 302*e* can be coupled to the MB TX filter 303*i*. For example, the MB TX filter 303*i* can be associated with cellular band B3 and/or B66. The MB TX filter 303*i* can be coupled to the phase shifter 304*e*. MB signals amplified by the MB PA 301 that are within a frequency band(s) associated with the MB TX filter 303*i* can pass through the MB TX filter 303*i* and can be routed through the phase shifter 304*e*, the switch 302*h*, the node MHB_ANT 208, the signal path 206, the node MIMO_OUT 210, and the antenna switch 356 to either the node MHB_ANT_OUT1 or the node MHB_ANT_OUT2 through a corresponding signal path.

The fourth throw of the switch 302*e* can be coupled to the MB TX/RX filter 303*k*. For example, the MB TX/RX filter 303*k* can be associated with cellular band B34. The MB TX/RX filter 303*k* can be coupled to the phase shifter 304*f*. MB signals amplified by the MB PA 301 that are within a frequency band associated with the MB TX/RX filter 303*k* can pass through the MB TX/RX filter 303*k* and can be routed through the phase shifter 304*f*, the switch 302*h*, the node MHB_ANT 208, the signal path 206, the node MIMO_OUT 210, and the antenna switch 356 to either the node MHB_ANT_OUT1 or the node MHB_ANT_OUT2 through a corresponding signal path.

The fifth throw of the switch 302*e* can be coupled to the MB TX/RX filter 303*l*. For example, the MB TX/RX filter 303*l* can be associated with cellular band B39. The MB TX/RX filter 303*l* can be coupled to the phase shifter 304*f*. MB signals amplified by the MB PA 301 that are within a frequency band associated with the MB TX/RX filter 303*l* can pass through the MB TX/RX filter 303*l* and can be routed through the phase shifter 304*f*, the switch 302*h*, the node MHB_ANT 208, the signal path 206, the node MIMO_OUT 210, and the antenna switch 356 to either the node MHB_ANT_OUT1 or the node MHB_ANT_OUT2 through a corresponding signal path.

The MIMO RX+MB TX module 202 can be controlled by a controller. For example, a mobile industry processer interface (MIPI) based controller can be provided to control the switches 302*a*-*h*, the MB PA 301, and the LNAs 305*a*-*e*. In the example of FIG. 3A, the MIMO RX+MB TX module 202 can include two controllers, for example, a first controller 306*a* to control the MB PA 301 and/or the switches 302*a*-*h* and a second controller 306*b* to control the LNAs 305*a*-*e*. The controllers 306*a* and 306*b* can provide control functionalities based on, for example, respective I/O voltages (VIO1, VIO2), respective clock signals (CLK1, CLK 2), and respective control inputs (DATA1, DATA 2).

Referring to FIG. 3B, the MHB PAiD module 204 can also be configured to support various RX and transmit TX operations, including MIMO operations, CA operations, and non-CA operations. For example, the MHB PAiD module 204 can support MIMO RX operations and MHB TX/RX operations for one or more frequency bands. In the example of FIG. 3B, the MHB PAiD module 204 can include a plurality of PAs 351, a plurality of switches 352, 356, a plurality of filters 353, a plurality of phase shifters 354, and a plurality of LNAs 355.

The MHB PAiD module 204 can support various RX operations involving HB and MB signals. The MHB PAiD module 204 can process RF signals received from the plurality of antennas coupled to the nodes MHB_ANT_OUT1 and MHB_ANT_OUT2. One or more throws of the antenna switch 356 can be coupled to a plurality of phase shifters 354*a*-*g*. A respective signal path associated with each phase shifter 354 and one or more filters 353 coupled to each phase shifter 354 can be used to support CA operations. Such CA operations can include DL CA operations.

In the example of FIG. 3B, a first throw of the antenna switch 356 can be coupled to the node MIMO_OUT 210. A second throw of the antenna switch 356 can be coupled to a node TX_2G_IN. For example, the MHB PAiD module 204 can receive LB signals, such as 2G signals, through the node TX_2G_IN. A third throw of the antenna switch 356 can be coupled to a phase shifter 354*a*. The phase shifter 354*a* can be coupled to a HB TX filter 353*a*, a HB RX filter 353*b*, and a MB RX filter 353*c*. For example, the filters 353*a*, 353*b*, 353*c* can be associated with cellular bands B30, B30, and B25, respectively. The filters 353*a*, 353*b*, 353*c* can be band-pass filters and allow signals associated with respective frequency bands to pass through. In some embodiments, the filters 353*a*, 353*b*, 353*c* can be configured as a triplexer, a diplexer, a duplexer, separate filters, or a combination thereof. The phase shifter 354*a* and the associated filters 353*a*, 353*b*, 353*c* can be used to support CA operations. For example, the phase shifter 354*a* can support CA involving one of cellular bands B2 and B66 with cellular band B7. The phase shifter 354*a* can support CA of B2 and B7, and CA of B66 and B7. As another example, the phase shifter 354*a* can support CA of cellular band B25 and B41F.

The HB RX filter 353*b* can be coupled to a switch 352*e* and route associated frequency band signals (e.g., B30) from the phase shifter 354*a* to the switch 352*e* through a corresponding signal path. For example, the switch 352*e* can be a SPMT switch. In the example of FIG. 3B, the switch 352*e* is a SPDT switch. The HB RX filter 353*b* can be coupled to a first throw of the switch 352*e*. The pole of the switch 352*e* can be coupled to a LNA 355*b*. The LNA 355*b* can support signals associated with one or more HBs. For example, the LNA 355*b* can support signals associated with cellular bands B30 and B40. The LNA 355*b* can be coupled to a switch 352*a*. The switch 352*a* can be a MPMT switch. In the example of FIG. 3B, the switch 352*a* is a DPDT switch. The LNA 355*b* can be coupled to a second throw of the switch 352*a*. A first pole of the switch 352*a* can be coupled to a node PRX_HB1, and a second pole of the switch 352*a* can be coupled to a node PRX_HB2. The nodes PRX_HB1 and PRX_HB2 can support HB signals received from the one or more primary antennas. HB signals can be routed from the HB RX filter 353b through the switch 352e, the LNA 355b, and the switch 352a to either the node PRX_HB1 or the node PRX_HB2 through a corresponding signal path.

The MB RX filter 353c can be coupled to a switch 352g and route associated frequency band signals (e.g., B25) through a corresponding signal path. For example, the switch 352g can be a SPMT switch. In the example of FIG. 3B, the switch 352g is a SP3T switch. The MB RX filter 353c can be coupled to a first throw of the switch 352g. The pole of the switch 352g can be coupled to a LNA 355d. The LNA 355d can support signals associated with one or more MBs. For example, the LNA 355d can support signals associated with cellular bands B25, B3, and B34. The LNA 355d can be coupled to a switch 352b. The switch 352b can be a MPMT switch. In the example of FIG. 3B, the switch 352b is a DPDT switch. The LNA 355d can be coupled to a second throw of the switch 352b. A first pole of the switch 352b can be coupled to a node PRX_MB1, and a second pole of the switch 352b can be coupled to a node PRX_MB2. The nodes PRX_MB1 and PRX_MB2 can support MB signals received from the one or more primary antennas. MB signals can be routed from the MB RX filter 353c through the switch 352g, the LNA 355d, and the switch 352b to either the node PRX_MB1 or the node PRX_MB2 through a corresponding signal path.

A fourth throw of the antenna switch 356 can be coupled to a phase shifter 354b. The phase shifter 354b can be coupled to a HB TX/RX filter 353d. For example, the filter 353d can be associated with cellular band B41F. The filter 353d can be a band-pass filter and allow signals associated with a respective frequency band to pass through. The phase shifter 354b and the associated filter 353d can be used to support CA operations. For example, the phase shifter 354b can support CA involving cellular band B41F with one of cellular bands B25, B1, B3, and B39. The phase shifter 354b can support CA of B41F and B25, CA of B41F and B1, CA of B41F and B3, and CA of B41F and B39. The HB TX/RX filter 353d can be coupled to a switch 352c and route associated frequency band signals (e.g., B41F) through a corresponding signal path. For example, the switch 352c can be a MPMT switch. In the example of FIG. 3B, the switch 352c is a double-pole four-throw (DP4T) switch. The HB TX/RX filter 353d can be coupled to a second throw of the switch 352c. A first pole of the switch 352c can be coupled to the HB PA 351a. A second pole of the switch 352c can be coupled to a first throw of a switch 352d. Additional details relating to the switch 352c are described below. The switch 352d can be a SPMT switch. In the example of FIG. 3B, the switch 352d is a SPDT switch. The switch 352d can be coupled to a LNA 355a. For example, the LNA 355a can be coupled to the pole of the switch 352d. The LNA 355a can support signals associated with one or more HBs. For example, the LNA 355a can support signals associated with cellular bands B41F and B7. The LNA 355a can be coupled to the switch 352a. For example, the LNA 355a can be coupled to a first throw of the switch 352a. HB signals can be routed from the HB TX/RX filter 353d through the switch 352c, the switch 352d, the LNA 355a, and the switch 352a to either the node PRX_HB1 or the node PRX_HB2 through a corresponding signal path.

A fifth throw of the antenna switch 356 can be coupled to a phase shifter 354c. The phase shifter 354c can be coupled to a HB TX filter 353e and a HB RX filter 353f. For example, the filters 353e, 353f can be associated with cellular band B7. The filters 353e, 353f can be band-pass filters and allow signals associated with respective frequency bands to pass through. In some embodiments, the filters 353e, 353f can be configured as a duplexer or as separate filters. The phase shifter 354c and the associated filters 353e, 353f can be used to support CA operations. For example, the phase shifter 304c can support CA involving cellular band B7 with one of cellular bands B1, B2, B3, and B66. The phase shifter 304c can support CA of B7 and B1, CA of B7 and B2, CA of B7 and B3, and CA of B7 and B66. As another example, the phase shifter 304c can also support CA of cellular bands B7 and B40. The HB RX filter 353f can be coupled to the switch 352d and route associated frequency band signals (e.g., B7) from the phase shifter 354c to the switch 352d through a corresponding signal path. The HB RX filter 353f can be coupled to a second throw of the switch 352d. The switch 352d can be coupled to the LNA 355a, and the LNA 355a can be coupled to the switch 352a. HB signals can be routed from the HB RX filter 353f through the switch 352d, the LNA 355a, and the switch 352a to either the node PRX_HB1 or the node PRX_HB2 through a corresponding signal path.

A sixth throw of the antenna switch 356 can be coupled to a switch 352h. The switch 352h can be a SPMT switch. In the example of FIG. 3B, the switch 352h is a SPDT switch. The pole of the switch 352h can be coupled to the sixth throw of the antenna switch 356. A first throw of the switch 352h can be coupled to a phase shifter 354d. The phase shifter 354d can be coupled to a HB TX filter 353g. A second throw of the switch 352h can be coupled to a phase shifter 354e. The phase shifter 354e can be coupled to a HB RX filter 353h. The filters 353g, 353h can be associated with cellular band B40F. The filters 353g, 353h can be band-pass filters and allow signals associated with a respective frequency band(s) to pass through. The phase shifter 354d and the associated filter 353g can be used to support CA operations. For example, the phase shifter 354d can support CA of cellular band B40F TX with one of cellular bands B7, B41, B1, and B3. The phase shifter 354d can support CA of B40F TX and B7, CA of B40F TX and B41, CA of B40F TX and B1, and CA of B40F TX and B3. The phase shifter 354e and the associated filter 353h can be used to support CA operations. For example, the phase shifter 354e can support CA of cellular band B40F RX with one of cellular bands B7, B41, B1, and B3. The phase shifter 354e can support CA of B40F RX and B7, CA of B40F RX and B41, CA of B40F RX and B1, and CA of B40F RX and B3. The HB RX filter 353h can be coupled to the switch 352e and route associated frequency band signals (e.g., B40F) from the phase shifter 354e to the switch 352e through a corresponding signal path. The HB RX filter 353h can be coupled to a second throw of the switch 352e. The switch 352e can be coupled to the LNA 355b, and the LNA 355b can be coupled to the switch 352a. HB signals can be routed from the HB RX filter 353h through the switch 352e, the LNA 355b, and the switch 352a to either the node PRX_HB1 or the node PRX_HB2 through a corresponding signal path.

A seventh throw of the antenna switch 356 can be coupled to a switch 352i. The switch 352i can be a SPMT switch. In the example of FIG. 3B, the switch 352i is a SPDT switch. The pole of the switch 352i can be coupled to the seventh throw of the antenna switch 356. A first throw of the switch 352i can be coupled to a phase shifter 354f. The phase shifter 354f can be coupled to a MB RX filter 353i. For example, the MB RX filter 353i can be associated with cellular band B3. A second throw of the switch 352i can be coupled to a phase shifter 354g. The phase shifter 354g can be coupled to a MB TX filter 353j and a MB RX filter 353k. For example, the filter 353j can be associated with one or more of cellular bands B3 and B66, and the filter 353*k* can be associated with one or more of cellular bands 1 and B66. The filters 353*i*, 353*j*, 353*k* can be band-pass filters and allow signals associated with respective frequency bands to pass through. In some embodiments, the filters 353*j*, 353*k* can be configured as a diplexer, as a duplexer, or as separate filters. The phase shifter 354*f* and the associated filter 353*i* can be used to support CA operations. For example, the phase shifter 354*f* can support CA involving cellular band B3 with one of cellular bands B40F and B41F. The phase shifter 354*f* can support CA of B3 and B40F, and CA of B3 and B41F. As another example, the phase shifter 354*f* can support CA of cellular bands B3, B40F, and B7. The MB RX filter 353*i* can be coupled to the switch 352*g* and route associated frequency band signals (e.g., B3) through a corresponding signal path. The MB RX filter 353*i* can be coupled to a second throw of the switch 352*g*. The switch 352*g* can be coupled to the LNA 355*d*, and the LNA 355*d* can be coupled to the switch 352*b*. MB signals can be routed from the MB RX filter 353*i* through the switch 352*g*, the LNA 355*d*, and the switch 352*b* to either the node PRX_MB1 or the node PRX_MB2 through a corresponding signal path. The phase shifter 354*g* and the associated filters 353*j*, 353*k* can be used to support CA operations. For example, the phase shifter 354*g* can support CA involving one of cellular bands B1 and B3 with one of cellular bands B40F and B41F. The phase shifter 354*g* can support CA of B1 and B40F, CA of B1 and B41F, CA of B3 and B40F, and CA of B3 and B41F. As another example, the phase shifter 354*g* can support CA involving one of cellular bands B1 and B3 with cellular bands B40F and B7. The phase shifter 354*g* can support CA of B1, B40F, and B7, and CA of B3, B40F, and B7. The MB RX filter 353*k* can be coupled to a switch 352*f* and route associated frequency band signals (e.g., B1, B66, etc.) through a corresponding signal path. The switch 352*f* can be a SPMT switch. In the example of FIG. 3B, the switch 352*f* is a SPDT switch. The MB RX filter 353*k* can be coupled to a first throw of the switch 352*f*. The pole of the switch 352*f* can be coupled to a LNA 355*c*. The LNA 355*c* can support signals associated with one or more frequency MB bands. For example, the LNA 355*c* can support signals associated with cellular bands B1, B66, and B39. The LNA 355*c* can be coupled to the switch 352*b*. For example, the LNA 355*c* can be coupled to a first throw of the switch 352*b*. MB signals can be routed from the MB RX filter 353*k* through the switch 352*f*, the LNA 355*c*, and the switch 352*b* to either the node PRX_MB1 or the node PRX_MB2 through a corresponding signal path.

An eighth throw of the antenna switch 356 can be coupled to a phase shifter 354*h*. The phase shifter 354*h* can be coupled to a MB RX filter 353*l* and a MB RX filter 353*m*. For example, the filters 353*l*, 353*m* can be associated with cellular bands B39 and B34, respectively. The filters 353*l*, 353*m*, can be band-pass filters and allow signals associated with respective frequency bands to pass through. In some embodiments, the filters 353*l*, 353*m* can be configured as a diplexer or as separate filters. The phase shifter 354*h* and the associated filters 353*l*, 353*m* can be used to support CA operations. For example, the phase shifter 354*h* can support CA involving one of cellular bands B34 and B39 with cellular band B41F. For example, the phase shifter 354*h* can support CA of B34 and B41F, and CA of B39 and B41F. The MB RX filter 353*l* can be coupled to the switch 352*f* and route associated frequency band signals (e.g., B39) from the phase shifter 354*h* to the switch 352*f* through a corresponding signal path. The MB RX filter 353*l* can be coupled to a second throw of the switch 352*f*. The switch 352*f* can be coupled to the LNA 355*c*, and the LNA 355*c* can be coupled to the switch 352*b*. MB signals can be routed from the MB RX filter 353*l* through the switch 352*f*, the LNA 355*c*, and the switch 352*b* to either the node PRX_MB1 or the node PRX_MB2 through a corresponding signal path. The MB RX filter 353*m* can be coupled to the switch 352*g* and route associated frequency band signals (e.g., B34) from the phase shifter 354*h* to the switch 352*g* through a corresponding signal path. The MB RX filter 353*m* can be coupled to a third throw of the switch 352*g*. The switch 352*g* can be coupled to the LNA 355*d*, and the LNA 355*d* can be coupled to the switch 352*b*. MB signals can be routed from the MB RX filter 353*m* through the switch 352*g*, the LNA 355*d*, and the switch 352*b* to either the node PRX_MB1 or the node PRX_MB2 through a corresponding signal path.

The MHB PAiD module 204 can also support various TX operations involving HB and MB signals. The MHB PAiD module 204 can include the HB PA 351*a* for amplifying HB signals for transmission. In some embodiments, the HB PA 351*a* can be an ET PA. The HB PA 351*a* can be coupled to a node TX_HB_IN. For example, HB signals to be amplified can be input to the node TX_HB_IN. The HB PA 351*a* can be coupled to the switch 352*c*. For example, the first pole of the switch 352*c* can be coupled to the HB PA 351*a*. A first throw of the switch 352*c* can be coupled to the HB TX filter 353*a*. For example, the HB TX filter 353*a* can be associated with cellular band B30. The HB TX filter 353*a* can be coupled to the phase shifter 354*a*. HB signals amplified by the HB PA 351*a* that are within a frequency band associated with the HB TX filter 353*a* can pass through the HB TX filter 353*a* and can be routed through the phase shifter 354*a* and the antenna switch 356 to either the node MHB_ANT_OUT1 or the node MHB_ANT_OUT2 through a corresponding signal path. HB signals routed to the node MHB_ANT_OUT1 or the node MHB_ANT_OUT2 can pass through corresponding filters 357*a*, 357*b*. In some embodiments, the filters 357*a*, 375*b* can be low-pass filters and allow signals with a frequency lower than a threshold frequency to pass through.

A second throw of the switch 352*c* can be coupled to the HB TX/RX filter 353*d*. For example, the HB TX/RX filter 353*d* can be associated with cellular band B41F. The HB TX/RX filter 353*d* can be coupled to the phase shifter 354*b*. HB signals amplified by the HB PA 351*a* that are within a frequency band associated with the HB TX/RX filter 353*d* can pass through the HB TX/RX filter 353*d* and can be routed through the phase shifter 354*b* and the antenna switch 356 to either the node MHB_ANT_OUT1 or the node MHB_ANT_OUT2 through a corresponding signal path.

A third throw of the switch 352*c* can be coupled to the HB TX filter 353*e*. For example, the HB TX filter 353*e* can be associated with cellular band B7. The HB TX filter 353*e* can be coupled to the phase shifter 354*c*. HB signals amplified by the HB PA 351*a* that are within a frequency band associated with the HB TX filter 353*e* can pass through the HB TX filter 353*e* and can be routed through the phase shifter 354*c* and the antenna switch 356 to either the node MHB_ANT_OUT1 or the node MHB_ANT_OUT2 through a corresponding signal path.

A fourth throw of the switch 352*c* can be coupled to the HB TX filter 353*g*. For example, the HB TX filter 353*g* can be associated with cellular band B40F. The HB TX filter 353*g* can be coupled to the phase shifter 354*d*. HB signals amplified by the HB PA 351*a* that are within a frequency band associated with the HB TX filter 353*g* can pass through the HB TX filter 353*g* and can be routed through the phase shifter 354*d*, the switch 352*h*, and the antenna switch 356 to either the node MHB_ANT_OUT1 or the node MHB_ANT_OUT2 through a corresponding signal path.

The MHB PAiD module 204 can also include the MB PA 351b for amplifying MB signals for transmission. In some embodiments, the MB PA 351b can be an ET PA. The MB PA 351b can be coupled to a node TX_MB_IN. For example, MB signals to be amplified can be input to the node TX_MB_IN. The MB PA 351b can be coupled to the MB TX filter 353j. For example, the HB TX filter 353j can be associated with one or more of cellular bands B3 and B66. MB signals amplified by the MB PA 351b that are within a frequency band associated with the HB TX filter 353j can pass through the HB TX filter 353j and can be routed through the phase shifter 354g, the switch 352i, and the antenna switch 356 to either the node MHB_ANT_OUT1 or the node MHB_ANT_OUT2 through a corresponding signal path.

The MHB PAiD module 204 can be controlled by a controller. For example, a MIPI based controller can be provided to control the switches 352a-h, 356, the PAs 351a-b, and the LNAs 355a-d. In the example of FIG. 3B, the MHB PAiD module 204 can include two controllers, for example, a first controller 358a to control the PAs 351a-b and/or the switches 352a-h, 356, and a second controller 358b to control the LNAs 355a-d. The controllers 358a and 358b can provide control functionalities based on, for example, respective I/O voltages (VIO1, VIO2), respective clock signals (CLK1, CLK 2), and respective control inputs (DATA1, DATA 2).

The MIMO RX+MB TX module 202 and the MHB PAiD module 204 can support MIMO operations. For example, signals having the same frequency band may be processed through more than one signal path simultaneously. A first signal path may be provided through the MIMO RX+MB TX module 202, and a second signal path may be provided through the MHB PAiD module 204.

Each of the MIMO RX+MB TX module 202 and the MHB PAiD module 204 can support CA operations. For example, a combined signal including signals associated with two or more frequency bands may be received and processed through respective signal paths associated with the two or more frequency bands.

The MIMO RX+MB TX module 202 and the MHB PAiD module 204 can also support non-CA operations. For example, a signal associated with a single frequency band can be received and processed through a respective signal path in either the MIMO RX+MB TX module 202 or the MHB PAiD module 204.

Table 1 lists various TX bands that can be supported by the example front-end architecture 200 of FIG. 2.

TABLE 1

(TX Band Support)

| MHB PAiD Module | MIMO RX + MB TX Module |
|---|---|
|  | 1 |
|  | 2/25 |
| 3/66 | 3 |
|  | 4/66 |
|  | 34 |
|  | 39 |
| 7 |  |
| 30 |  |
| 40 |  |
| 41 |  |

The MIMO RX+MB TX module 202 and the MHB PAiD module 204 can support TX operations for one or more different bands from each other. For example, the MB PA 301 can support TX operations for a first set of mid bands, and the MB PA 302 can support TX operations for a second set of mid bands, where the first of mid bands and the second set of mid bands include at least one different mid band. As an example, the MB PA 301 can support TX operations for cellular bands B1, B2/B25, B3, B4/B66, B34, and B39, and the MB PA 351b can support TX operations for cellular bands B3 and B66. By including the MB PA 301 in the MIMO RX+MB TX module 202 and the MB PA 351b in the MHB PAiD module 204, the example front-end architecture 200 can support a wide range of MB TX frequencies.

It will be understood that the example front-end architecture 200 of FIG. 2 can be configured to provide support for other bands utilizing one or more features of the present disclosure.

In some embodiments, various systems, devices and/or methods having one or more features as described herein can be implemented in manners similar to the various examples provided in the above-referenced U.S. patent application Ser. Nos. 15/936,429 and 15/936,430.

Figure 4A:
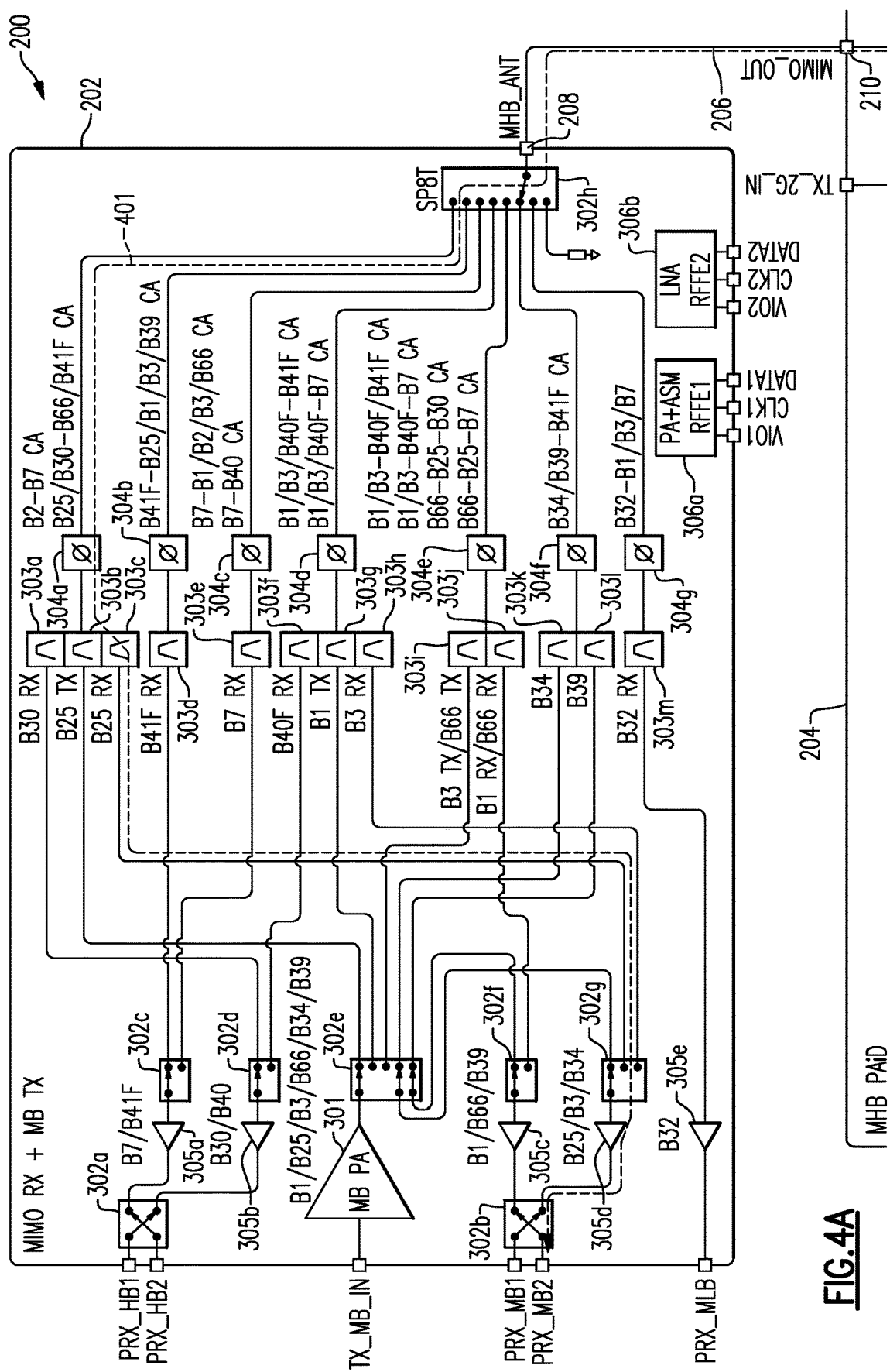
FIG. 4A is a schematic block diagram showing an example signal path configured to support multi-input multi-output operations, according to some embodiments of the present disclosure.
Figure 4B:
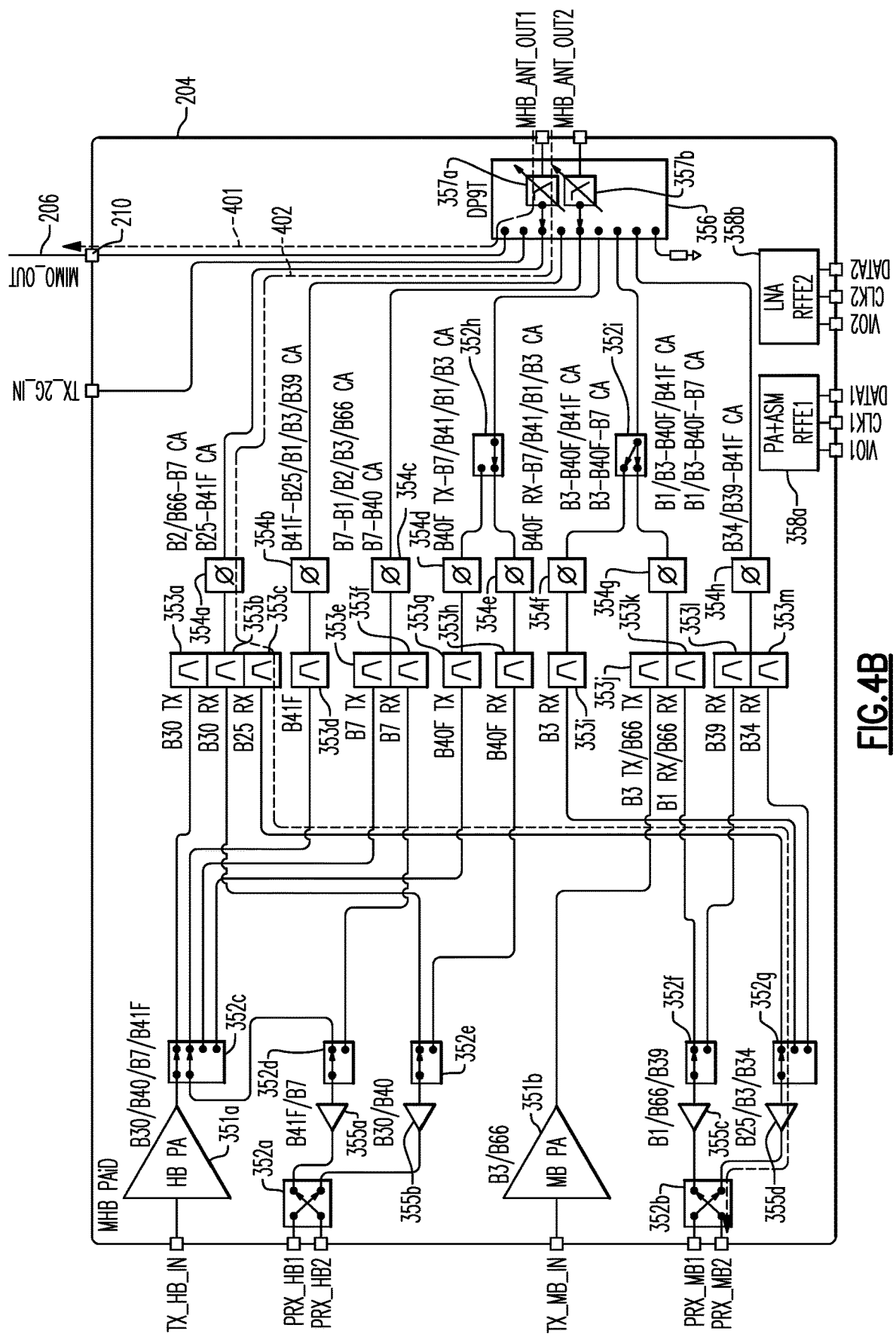
FIG. 4B is a schematic block diagram showing an example signal path configured to support multi-input multi-output operations, according to some embodiments of the present disclosure.

FIG. 4A is a schematic block diagram showing an example signal path 401 configured to support MIMO operations, according to some embodiments of the present disclosure. FIG. 4B is a schematic block diagram showing an example signal path 402 configured to support MIMO operations, according to some embodiments of the present disclosure. The MIMO RX+MB TX module 202 and the MHB PAiD module 204 can support MIMO operations, for example, by receiving signals associated with the same frequency band through two or more signal paths simultaneously. In the example of FIGS. 4A and 4B, B25 RX signals are received and routed through a signal path 401 in the MIMO RX+MB TX module 202 and a signal path 402 in the MHB PAiD module 204.

Figure 5:
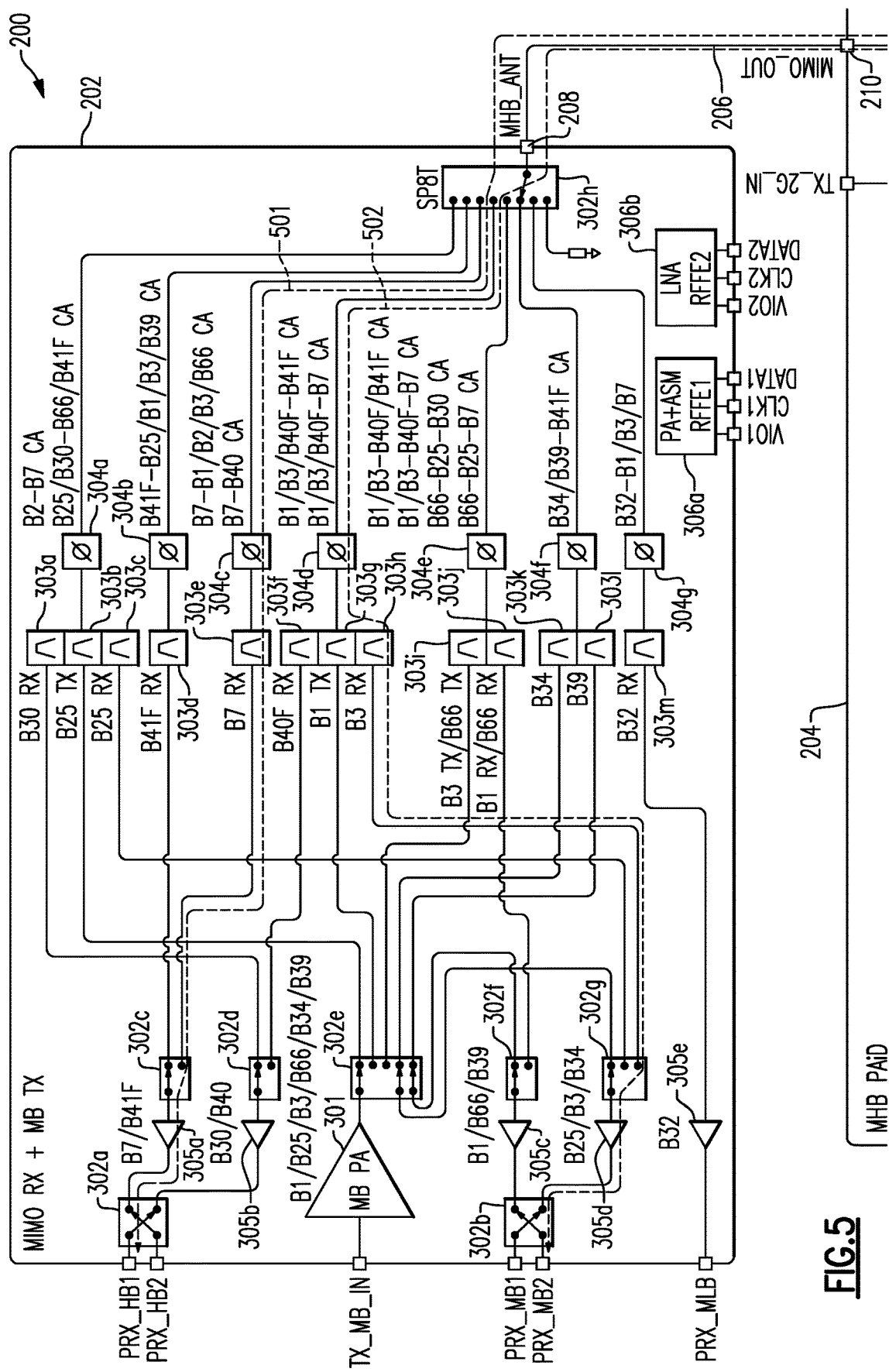
FIG. 5 is a schematic block diagram showing example signal paths configured to support carrier aggregation operations, according to some embodiments of the present disclosure.

FIG. 5 is a schematic block diagram showing example signal paths 501 and 502 configured to support CA operations, according to some embodiments of the present disclosure. For example, the MIMO RX+MB TX module 202 can receive and process combined signals including signals associated with two or more frequency bands. In the example of FIG. 5, the MIMO RX+MB TX module 202 can receive and process B7 signals and B3 signals through corresponding signal paths 501 and 502. Similarly, the MBH PAiD module 204 can also receive and process signals associated with two or more frequency bands (e.g., B7 and B3).

Figure 6:
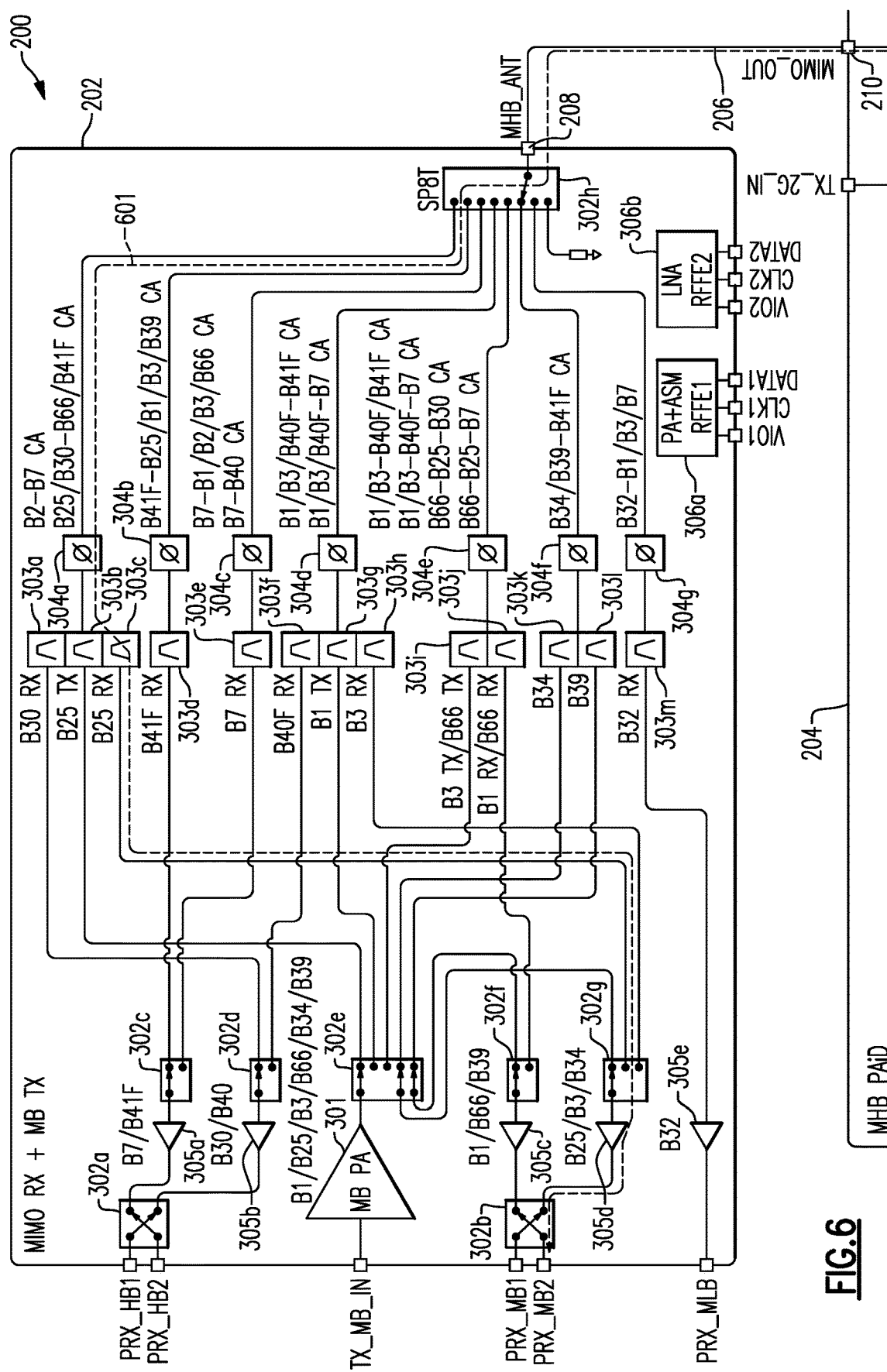
FIG. 6 is a schematic block diagram showing an example signal path configured to support non-carrier aggregation operations, according to some embodiments of the present disclosure.

FIG. 6 is a schematic block diagram showing an example signal path 601 configured to support non-carrier aggregation operations, according to some embodiments of the present disclosure. For example, the MIMO RX+MB TX module 202 and the MHB PAiD module 204 can each receive and process a signal associated with a particular frequency band through a corresponding signal path. In the example of FIG. 6, the MIMO RX+MB TX module 202 can receive and process B25 signals through a signal path 601.

Figure 7A:
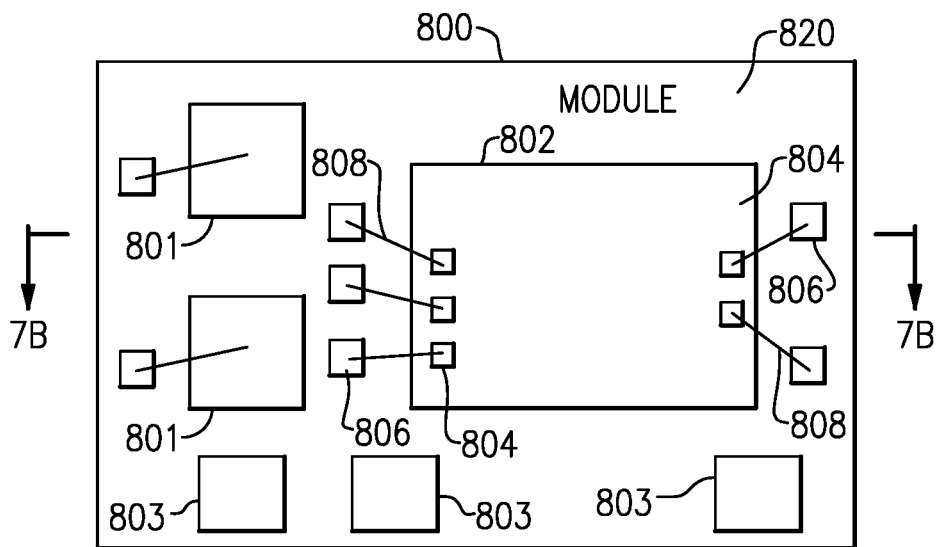
FIG. 7A is a schematic diagram of a packaged module, according to some embodiments of the present disclosure.
Figure 7B:
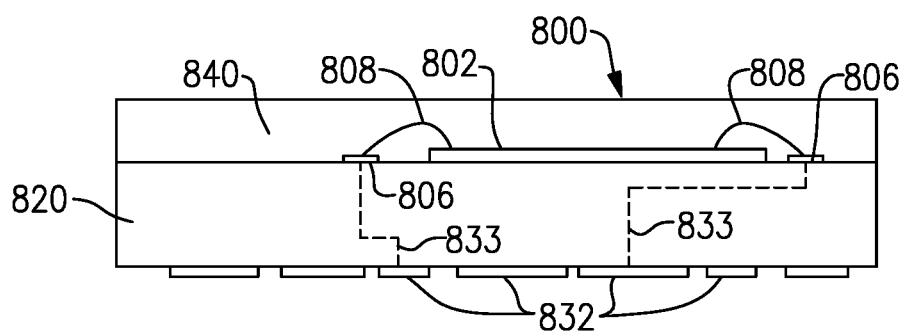
FIG. 7B is a schematic diagram of a cross-section of the packaged module of FIG. 7A, according to some embodiments of the present disclosure.

FIG. 7A is a schematic diagram of one embodiment of a packaged module 800. FIG. 7B is a schematic diagram of a cross-section of the packaged module 800 of FIG. 7A taken along the lines 7B-7B.

The packaged module 800 includes a semiconductor die 801, surface mount components 803, wirebonds 808, a package substrate 820, and encapsulation structure 840. The package substrate 820 includes pads 806 formed from conductors disposed therein. Additionally, the semiconductor die 801 includes pins or pads 804, and the wirebonds 808 have been used to connect the pads 804 of the die 801 to the pads 806 of the package substrate 801.

The RFFE systems herein can include one or more packaged modules, such as the packaged module 800. Although the packaged module 800 of FIGS. 7A-7B illustrates one example implementation of a module suitable for use in an RFFE system, the teachings herein are applicable to modules implemented in other ways.

The packaging substrate 820 can be configured to receive a plurality of components such as the semiconductor die 801 and the surface mount components 803, which can include, for example, surface mount capacitors and/or inductors.

As shown in FIG. 7B, the packaged module 800 is shown to include a plurality of contact pads 832 disposed on the side of the packaged module 800 opposite the side used to mount the semiconductor die 801. Configuring the packaged module 800 in this manner can aid in connecting the packaged module 800 to a circuit board, such as a phone board of a wireless device. The example contact pads 832 can be configured to provide radio frequency signals, bias signals, and/or power (for example, a power supply voltage and ground) to the semiconductor die 801 and/or the surface mount components 803. As shown in FIG. 7B, the electrical connections between the contact pads 832 and the semiconductor die 801 can be facilitated by connections 833 through the package substrate 820. The connections 833 can represent electrical paths formed through the package substrate 820, such as connections associated with vias and conductors of a multilayer laminated package substrate.

In some embodiments, the packaged module 800 can also include one or more packaging structures to, for example, provide protection and/or facilitate handling. Such a packaging structure can include overmold or encapsulation structure 840 formed over the packaging substrate 820 and the components and die(s) disposed thereon.

It will be understood that although the packaged module 800 is described in the context of electrical connections based on wirebonds, one or more features of the present disclosure can also be implemented in other packaging configurations, including, for example, flip chip configurations.

For the purpose of description, it will be understood that low band (LB), mid band (MB), and high band (HB) can include frequency bands associated with such bands. Such frequency bands can include cellular frequency bands such as the examples listed in Table 2. It will be understood that at least some of the bands can be divided into sub-bands. It will also be understood that one or more features of the present disclosure can be implemented with frequency ranges that do not have designations such as the examples of Table 2.

TABLE 2

| Band | Mode | Tx Frequency Range (MHz) | Rx Frequency Range (MHz) |
|---|---|---|---|
| B1 | FDD | 1,920-1,980 | 2,110-2,170 |
| B2 | FDD | 1,850-1,910 | 1,930-1,990 |
| B3 | FDD | 1,710-1,785 | 1,805-1,880 |
| B4 | FDD | 1,710-1,755 | 2,110-2,155 |
| B5 | FDD | 824-849 | 869-894 |
| B6 | FDD | 830-840 | 875-885 |
| B7 | FDD | 2,500-2,570 | 2,620-2,690 |
| B8 | FDD | 880-915 | 925-960 |
| B9 | FDD | 1,749.9-1,784.9 | 1,844.9-1,879.9 |
| B10 | FDD | 1,710-1,770 | 2,110-2,170 |
| B11 | FDD | 1,427.9-1,447.9 | 1,475.9-1,495.9 |

TABLE 2-continued

| Band | Mode | Tx Frequency Range (MHz) | Rx Frequency Range (MHz) |
|---|---|---|---|
| B12 | FDD | 699-716 | 729-746 |
| B13 | FDD | 777-787 | 746-756 |
| B14 | FDD | 788-798 | 758-768 |
| B15 | FDD | 1,900-1,920 | 2,600-2,620 |
| B16 | FDD | 2,010-2,025 | 2,585-2,600 |
| B17 | FDD | 704-716 | 734-746 |
| B18 | FDD | 815-830 | 860-875 |
| B19 | FDD | 830-845 | 875-890 |
| B20 | FDD | 832-862 | 791-821 |
| B21 | FDD | 1,447.9-1,462.9 | 1,495.9-1,510.9 |
| B22 | FDD | 3,410-3,490 | 3,510-3,590 |
| B23 | FDD | 2,000-2,020 | 2,180-2,200 |
| B24 | FDD | 1,626.5-1,660.5 | 1,525-1,559 |
| B25 | FDD | 1,850-1,915 | 1,930-1,995 |
| B26 | FDD | 814-849 | 859-894 |
| B27 | FDD | 807-824 | 852-869 |
| B28 | FDD | 703-748 | 758-803 |
| B29 | FDD | N/A | 716-728 |
| B30 | FDD | 2,305-2,315 | 2,350-2,360 |
| B31 | FDD | 452.5-457.5 | 462.5-467.5 |
| B32 | FDD | N/A | 1,452-1,496 |
| B33 | TDD | 1,900-1,920 | 1,900-1,920 |
| B34 | TDD | 2,010-2,025 | 2,010-2,025 |
| B35 | TDD | 1,850-1,910 | 1,850-1,910 |
| B36 | TDD | 1,930-1,990 | 1,930-1,990 |
| B37 | TDD | 1,910-1,930 | 1,910-1,930 |
| B38 | TDD | 2,570-2,620 | 2,570-2,620 |
| B39 | TDD | 1,880-1,920 | 1,880-1,920 |
| B40 | TDD | 2,300-2,400 | 2,300-2,400 |
| B41 | TDD | 2,496-2,690 | 2,496-2,690 |
| B42 | TDD | 3,400-3,600 | 3,400-3,600 |
| B43 | TDD | 3,600-3,800 | 3,600-3,800 |
| B44 | TDD | 703-803 | 703-803 |

Some of the embodiments described above have provided examples in connection with mobile devices. However, the principles and advantages of the embodiments can be used for any other systems or apparatus that have needs for RFFE systems.

Such RFFE systems can be implemented in various electronic devices. Examples of the electronic devices can include, but are not limited to, consumer electronic products, parts of the consumer electronic products, electronic test equipment, etc. Examples of the electronic devices can also include, but are not limited to, memory chips, memory modules, circuits of optical networks or other communication networks, and disk driver circuits. The consumer electronic products can include, but are not limited to, a mobile phone, a telephone, a television, a computer monitor, a computer, a hand-held computer, a personal digital assistant (PDA), a microwave, a refrigerator, an automobile, a stereo system, a cassette recorder or player, a DVD player, a CD player, a VCR, an MP3 player, a radio, a camcorder, a camera, a digital camera, a portable memory chip, a washer, a dryer, a washer/dryer, a copier, a facsimile machine, a scanner, a multi-functional peripheral device, a wrist watch, a clock, etc. Further, the electronic devices can include unfinished products.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts may be performed as a single step and/or phase. Also, certain steps and/or phases may be broken into additional subcomponents to be performed separately. In some instances, the order of the steps and/or phases may be rearranged and certain steps and/or phases may be omitted entirely. Also, the methods described herein are to be understood to be open-ended, such that additional steps and/or phases to those shown and described herein may also be performed.

Although various embodiments and examples are disclosed above, inventive subject matter extends beyond the specifically disclosed embodiments to other alternative embodiments and/or uses and to modifications and equivalents thereof. Thus, the scope of the claims that may arise from this disclosure is not limited by any of the particular embodiments described above. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Some aspects of the systems and methods described herein may advantageously be implemented using, for example, computer software, hardware, firmware, or any combination of computer software, hardware, and firmware. Computer software may comprise computer executable code stored in a computer readable medium (e.g., non-transitory computer readable medium) that, when executed, performs the functions described herein. In some embodiments, computer-executable code is executed by one or more general purpose computer processors. A skilled artisan will appreciate, in light of this disclosure, that any feature or function that may be implemented using software to be executed on a general purpose computer may also be implemented using a different combination of hardware, software, or firmware. For example, such a module may be implemented completely in hardware using a combination of integrated circuits. Alternatively or additionally, such a feature or function may be implemented completely or partially using specialized computers designed to perform the particular functions described herein rather than by general purpose computers.

Multiple distributed computing devices may be substituted for any one computing device described herein. In such distributed embodiments, the functions of the one computing device are distributed (e.g., over a network) such that some functions are performed on each of the distributed computing devices.

Some embodiments may be described with reference to equations, algorithms, and/or flowchart illustrations. These methods may be implemented using computer program instructions executable on one or more computers. These methods may also be implemented as computer program products either separately, or as a component of an apparatus or system. In this regard, each equation, algorithm, block, or step of a flowchart, and combinations thereof, may be implemented by hardware, firmware, and/or software including one or more computer program instructions embodied in computer-readable program code logic. As will be appreciated, any such computer program instructions may be loaded onto one or more computers, including without limitation a general purpose computer or special purpose computer, or other programmable processing apparatus to produce a machine, such that the computer program instructions which execute on the computer(s) or other programmable processing device(s) implement the functions specified in the equations, algorithms, and/or flowcharts. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, computer program instructions, such as embodied in computer-readable program code logic, may also be stored in a computer readable memory (e.g., a non-transitory computer readable medium) that may direct one or more computers or other programmable processing devices to function in a particular manner, such that the instructions stored in the computer-readable memory implement the function(s) specified in the block(s) of the flowchart(s). The computer program instructions may also be loaded onto one or more computers or other programmable computing devices to cause a series of operational steps to be performed on the one or more computers or other programmable computing devices to produce a computer-implemented process such that the instructions which execute on the computer or other programmable processing apparatus provide steps for implementing the functions specified in the equation(s), algorithm(s), and/or block(s) of the flowchart(s).

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list. The word "exemplary" is used exclusively herein to mean "serving as an example, instance, or illustration." Any implementation described herein as "exemplary" is not necessarily to be construed as preferred or advantageous over other implementations. Furthermore, the terms "first," "second," "third," "fourth," etc., as used herein are meant as labels to distinguish among different elements and may not necessarily have an ordinal meaning according to their numerical designation.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein may be applied to other methods and systems, and are not limited to the methods and systems described above, and elements and acts of the various embodiments described above may be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A radio frequency front end system comprising:
   a first module including at least one power amplifier, the first module configured to provide multi-input multi-output (MIMO) receive operations for a first plurality of mid bands and a first plurality of high bands, the first module further configured to provide transmit operations for the plurality of mid bands, the first module including a first node; and
   a second module including at least one power amplifier, the second module configured to provide transmit and receive operations for a second plurality of mid bands and a second plurality of high bands, the second module being a power amplifier integrated duplexer (PAiD) module, the second module including a second node, the first module and the second module coupled by a signal path at the first node and the second node, respectively, the second module coupled to at least one antenna, the second module configured to provide receive signals from the at least one antenna to the first module through the second node, the signal path, and the first node.

2. The radio frequency front end system of claim 1 wherein the second module is coupled to a plurality of antennas.

3. The radio frequency front end system of claim 2 wherein the second module includes an antenna switch coupled to the plurality of antennas, the antenna switch configured to route signals between the plurality of antennas and the first module through the first node, the signal path, and the second node.

4. The radio frequency front end system of claim 1 wherein the first module includes a mid-band power amplifier configured to amplify signals associated with the first plurality of mid bands.

5. The radio frequency front end system of claim 1 wherein the second module includes a high-band power amplifier configured to amplify signals associated with the second plurality of high bands and a mid-band power amplifier configured to amplify signals associated with the second plurality of mid bands.

6. The radio frequency front end system of claim 1 wherein the first module includes a plurality of transmit filters, a plurality of receive filters, and a plurality of phase shifters.

7. The radio frequency front end system of claim 1 wherein the second module includes a plurality of transmit filters, a plurality of receive filters, and a plurality of phase shifters.

8. The radio frequency front end system of claim 1 wherein the first module and the second module are configured to provide MIMO receive operations for at least some of the first plurality of mid bands and the second plurality of mid bands, and at least some of the first plurality of high bands and the second plurality of high bands.

9. The radio frequency front end system of claim 1 wherein the first module is configured to provide carrier aggregation operations for two or more of the first plurality of mid bands and the first plurality of high bands, and the second module is configured to provide carrier aggregation operations for two or more of the second plurality of mid bands and the second plurality of high bands.

10. The radio frequency front end system of claim 1 wherein the first module and the second module provide transmit operations for one or more different bands from each other.

11. The radio frequency front end system of claim 1 wherein the first plurality of mid bands and the second plurality of mid bands have a frequency between 1 GHz and 2.3 GHz, and the first plurality of high bands and the second plurality of high bands have a frequency greater than 2.3 GHz.

12. A wireless device comprising:
a plurality of antennas;
a transceiver; and
a radio frequency front end system coupled between the transceiver and the plurality of primary antennas, the radio frequency front end system including a first module including at least one power amplifier, the first module configured to provide multi-input multi-output (MIMO) receive operations for a first plurality of mid bands and a first plurality of high bands, the first module further configured to provide transmit operations for the plurality of mid bands, the first module including a first node, and a second module including at least one power amplifier, the second module configured to provide transmit and receive operations for a second plurality of mid bands and a second plurality of high bands, the second module being a power amplifier integrated duplexer (PAiD) module, the second module including a second node, the first module and the second module coupled by a signal path at the first node and the second node, respectively, the second module coupled to at least one antenna, the second module configured to provide receive signals from the at least one antenna to the first module through the second node, the signal path, and the first node.

13. The wireless device of claim 12 wherein the second module is coupled to the plurality of antennas.

14. The wireless device of claim 13 wherein the second module includes an antenna switch coupled to the plurality of antennas, the antenna switch configured to route signals between the plurality of antennas and the first module through the first node, the signal path, and the second node.

15. The wireless device of claim 12 wherein the first module includes a mid-band power amplifier configured to amplify signals associated with the first plurality of mid bands.

16. The wireless device of claim 12 wherein the second module includes a high-band power amplifier configured to amplify signals associated with the second plurality of high bands and a mid-band power amplifier configured to amplify signals associated with the second plurality of mid bands.

17. The wireless device of claim 12 wherein the first module and the second module are configured to provide MIMO receive operations for at least some of the first plurality of mid bands and the second plurality of mid bands, and at least some of the first plurality of high bands and the second plurality of high bands.

18. The wireless device of claim 12 wherein the first module is configured to provide carrier aggregation operations for two or more of the first plurality of mid bands and the first plurality of high bands, and the second module is configured to provide carrier aggregation operations for two or more of the second plurality of mid bands and the second plurality of high bands.

19. The wireless device of claim 12 wherein the first module and the second module provide transmit operations for one or more different bands from each other.

20. The wireless device of claim 12 wherein the first plurality of mid bands and the second plurality of mid bands have a frequency between 1 GHz and 2.3 GHz, and the first plurality of high bands and the second plurality of high bands have a frequency greater than 2.3 GHz.

* * * * *